(12) United States Patent
Evans

(10) Patent No.: US 8,123,263 B2
(45) Date of Patent: Feb. 28, 2012

(54) ENERGY MANAGEMENT BEAM

(75) Inventor: Darin Evans, Spring Lake, MI (US)

(73) Assignee: Shape Corp., Grand Haven, MI (US)

( * ) Notice: Subject to any disclaimer, the term of this patent is extended or adjusted under 35 U.S.C. 154(b) by 903 days.

(21) Appl. No.: 11/612,152

(22) Filed: Dec. 18, 2006

(65) Prior Publication Data

US 2007/0187960 A1 Aug. 16, 2007

Related U.S. Application Data

(63) Continuation-in-part of application No. 11/220,881, filed on Sep. 7, 2005, now Pat. No. 7,393,029, which is a continuation-in-part of application No. 10/997,332, filed on Nov. 24, 2004, now Pat. No. 7,021,686, which is a continuation of application No. 10/648,757, filed on Aug. 26, 2003, now Pat. No. 6,942,262, which is a continuation-in-part of application No. 09/964,914, filed on Sep. 27, 2001, now Pat. No. 6,648,384, said application No. 11/220,881 is a continuation-in-part of application No. 10/808,127, filed on Mar. 24, 2004, now Pat. No. 7,407,219, and a continuation-in-part of application No. PCT/US03/39803, filed on Dec. 15, 2003.

(60) Provisional application No. 60/607,677, filed on Sep. 7, 2004, provisional application No. 60/751,522, filed on Dec. 19, 2005, provisional application No. 60/793,069, filed on Apr. 19, 2006, provisional application No. 60/484,712, filed on Jul. 3, 2003.

(51) Int. Cl.
*B60R 19/26* (2006.01)

(52) U.S. Cl. ........................................ 293/132

(58) Field of Classification Search ............... 293/132, 293/102, 133, 122; 138/371, 377, 376; 188/371, 188/377, 376
See application file for complete search history.

(56) References Cited

U.S. PATENT DOCUMENTS 3,231,454 A 1/1966 Williams
(Continued)

FOREIGN PATENT DOCUMENTS

DE 3711692 10/1988
(Continued)

OTHER PUBLICATIONS

U.S. Patent Application Publication No. 2003/0209915, entitled Shock Absorber, Inventor Yoshida, Publication Date Nov. 13, 2003.
U.S. Patent Application Publication No. 2004/0178662, published Sep. 16, 2004, Title "Modular Energy Absorber and Method for Configuring Same," Inventors Phillip Patrick Carroll III et al.

*Primary Examiner* — Kiran B. Patel
(74) *Attorney, Agent, or Firm* — Price Heneveld LLP

(57) ABSTRACT

A tube comprising an outer tube section with a stepped outer surface and an inner tube section, with the inner tube section being located within the outer tube section. The tube also comprises a spanning section connecting an end of the outer tube section to an end of the inner tube section. The outer tube section is longer than the inner tube section, whereby, upon undergoing a longitudinal impact, the outer tube section crushes predictably and sooner than the inner tube section upon the energy management tube receiving forces from the longitudinal impact, to thereby create a first energy absorption level during crushing of the outer tube section alone and a second energy absorption level during crushing of the outer tube section and the inner tube section.

28 Claims, 29 Drawing Sheets

U.S. PATENT DOCUMENTS

| | | | | |
|---|---|---|---|---|
| 3,251,076 A | | 5/1966 | Burke | |
| 3,307,868 A | | 3/1967 | Blank | |
| 3,511,345 A | * | 5/1970 | Ando et. al. | 188/371 |
| 3,577,305 A | | 5/1971 | Hines et al. | |
| 3,599,757 A | * | 8/1971 | Takamatsu et al. | 188/371 |
| 3,695,665 A | | 10/1972 | Matsuura | |
| 3,706,359 A | | 12/1972 | Skralskis | |
| 3,738,696 A | | 6/1973 | McLauchlan | |
| 3,746,605 A | | 7/1973 | Dillon et al. | |
| 3,747,968 A | | 7/1973 | Hornsby | |
| 3,768,850 A | | 10/1973 | Barton et al. | |
| 3,773,373 A | | 11/1973 | McLauchlan | |
| 3,782,767 A | | 1/1974 | Moore | |
| 3,782,768 A | | 1/1974 | Moore | |
| 3,810,668 A | | 5/1974 | Kornhauser | |
| 3,837,991 A | | 9/1974 | Evans | |
| 3,885,074 A | | 5/1975 | Chandler | |
| 3,900,222 A | | 8/1975 | Muller | |
| 3,900,356 A | | 8/1975 | Koch et al. | |
| 3,902,748 A | | 9/1975 | Bank et al. | |
| 3,905,630 A | | 9/1975 | Cantrell | |
| 3,912,295 A | | 10/1975 | Eggert, Jr. | |
| 3,938,841 A | * | 2/1976 | Glance et al. | 293/120 |
| 3,971,583 A | | 7/1976 | Kornhauser | |
| 3,972,744 A | | 8/1976 | Cantrell | |
| 3,983,962 A | | 10/1976 | Torke | |
| 3,997,208 A | | 12/1976 | Nomiyama | |
| 3,998,485 A | * | 12/1976 | Putter et al. | 293/133 |
| 4,010,969 A | | 3/1977 | Cantrell et al. | |
| 4,023,652 A | | 5/1977 | Torke | |
| 4,050,689 A | | 9/1977 | Barton et al. | |
| 4,061,385 A | | 12/1977 | Schwartzberg | |
| 4,070,052 A | | 1/1978 | Ng | |
| 4,076,872 A | | 2/1978 | Lewicki et al. | |
| 4,096,306 A | | 6/1978 | Larson | |
| 4,116,480 A | | 9/1978 | Crestetto | |
| 4,152,012 A | | 5/1979 | Reidelbach et al. | |
| 4,181,198 A | | 1/1980 | Lindberg | |
| 4,194,763 A | | 3/1980 | Reidelbach et al. | |
| 4,287,250 A | | 9/1981 | Rudy | |
| 4,314,865 A | | 2/1982 | Ottaviano | |
| 4,344,536 A | | 8/1982 | Oberhuber | |
| 4,408,790 A | * | 10/1983 | Shimoda et al. | 293/122 |
| 4,427,474 A | | 1/1984 | Ottaviano | |
| 4,533,583 A | | 8/1985 | May | |
| 4,551,379 A | | 11/1985 | Kerr | |
| 4,597,601 A | | 7/1986 | Manning | |
| 4,631,221 A | | 12/1986 | Disselbeck | |
| 4,830,417 A | | 5/1989 | Bates et al. | |
| 4,890,877 A | | 1/1990 | Ashtiani-Zarandi et al. | |
| 4,995,659 A | | 2/1991 | Park | |
| 5,030,501 A | | 7/1991 | Colvin et al. | |
| 5,042,859 A | | 8/1991 | Zhang et al. | |
| 5,080,410 A | | 1/1992 | Stewart et al. | |
| 5,098,124 A | | 3/1992 | Breed et al. | |
| 5,106,137 A | | 4/1992 | Curtis | |
| 5,141,279 A | | 8/1992 | Weller | |
| 5,152,023 A | | 10/1992 | Graebe | |
| 5,201,558 A | * | 4/1993 | Thum | 293/133 |
| 5,224,574 A | * | 7/1993 | Thum | 188/371 |
| 5,243,722 A | | 9/1993 | Gusakov | |
| 5,293,973 A | * | 3/1994 | Thum | 188/377 |
| 5,314,229 A | | 5/1994 | Matuzawa et al. | |
| 5,332,281 A | | 7/1994 | Janotik et al. | |
| 5,356,177 A | | 10/1994 | Weller | |
| 5,403,049 A | * | 4/1995 | Ebbinghaus | 293/133 |
| 5,431,463 A | | 7/1995 | Chou | |
| 5,460,416 A | | 10/1995 | Freidrich et al. | |
| 5,492,207 A | | 2/1996 | Clausen | |
| 5,549,327 A | * | 8/1996 | Rusche et al. | 280/751 |
| 5,564,535 A | | 10/1996 | Kanianthra | |
| 5,566,777 A | | 10/1996 | Tronuner et al. | |
| 5,596,781 A | | 1/1997 | Graebe | |
| 5,597,055 A | * | 1/1997 | Han et al. | 188/371 |
| 5,632,507 A | | 5/1997 | Sinner et al. | |
| 5,651,569 A | | 7/1997 | Molnar | |
| 5,732,801 A | | 3/1998 | Gertz | |
| 5,851,626 A | | 12/1998 | McCorry et al. | |
| 5,868,457 A | | 2/1999 | Kitagawa | |
| 5,913,565 A | | 6/1999 | Watanabe | |
| 5,972,134 A | | 10/1999 | Buschsieweke et al. | |
| 5,984,390 A | | 11/1999 | Kemp et al. | |
| 6,017,084 A | | 1/2000 | Carroll, III | |
| 6,062,355 A | * | 5/2000 | Nohr et al. | 188/374 |
| 6,102,605 A | | 8/2000 | Emmons | |
| 6,106,039 A | | 8/2000 | Maki | |
| 6,139,655 A | | 10/2000 | Kowalski et al. | |
| 6,174,009 B1 | | 1/2001 | McKeon | |
| 6,176,530 B1 | | 1/2001 | Gollungberg | |
| 6,179,355 B1 | * | 1/2001 | Chou et al. | 293/132 |
| 6,189,941 B1 | * | 2/2001 | Nohr | 293/118 |
| 6,199,937 B1 | * | 3/2001 | Zetouna et al. | 293/136 |
| 6,199,942 B1 | | 3/2001 | Carroll, III | |
| 6,203,098 B1 | | 3/2001 | Motozawa et al. | |
| 6,231,095 B1 | * | 5/2001 | Chou et al. | 293/133 |
| 6,234,526 B1 | | 5/2001 | Song et al. | |
| 6,247,745 B1 | | 6/2001 | Carroll, III et al. | |
| 6,250,711 B1 | | 6/2001 | Takahara | |
| 6,258,465 B1 | | 7/2001 | Oka et al. | |
| 6,293,587 B1 | | 9/2001 | Lapic et al. | |
| 6,299,239 B1 | | 10/2001 | Sagawa et al. | |
| 6,315,339 B1 | | 11/2001 | Devilliers et al. | |
| 6,371,859 B1 | * | 4/2002 | Gibson | 464/183 |
| 6,375,251 B1 | | 4/2002 | Taghaddos | |
| 6,386,347 B1 | * | 5/2002 | Reynaert | 188/377 |
| 6,406,079 B2 | | 6/2002 | Tamada et al. | |
| 6,406,081 B1 | | 6/2002 | Mahfet et al. | |
| 6,409,239 B1 | * | 6/2002 | Tjoelker et al. | 293/133 |
| 6,435,579 B1 | | 8/2002 | Glance | |
| 6,443,513 B1 | | 9/2002 | Glance | |
| 6,474,708 B1 | | 11/2002 | Gehringhoff et al. | |
| 6,523,873 B1 | | 2/2003 | Summe et al. | |
| 6,540,276 B2 | | 4/2003 | Azuchi et al. | |
| 6,554,333 B2 | * | 4/2003 | Shimotsu et al. | 293/132 |
| 6,575,510 B2 | | 6/2003 | Weissenborn | |
| 6,601,886 B1 | * | 8/2003 | Thayer | 293/133 |
| 6,609,740 B2 | | 8/2003 | Evans | |
| 6,626,474 B1 | | 9/2003 | Ameur | |
| 6,644,701 B2 | | 11/2003 | Weissenborn et al. | |
| 6,648,384 B2 | * | 11/2003 | Nees et al. | 293/132 |
| 6,669,251 B2 | | 12/2003 | Trappe | |
| 6,679,967 B1 | | 1/2004 | Carroll, III | |
| 6,681,907 B2 | * | 1/2004 | Le | 188/371 |
| 6,682,128 B2 | | 1/2004 | Carroll, III et al. | |
| 6,702,345 B1 | * | 3/2004 | Yoshida | 293/133 |
| 6,726,262 B2 | | 4/2004 | Marijnissen et al. | |
| 6,752,450 B2 | | 6/2004 | Carroll, III et al. | |
| 6,802,548 B2 | * | 10/2004 | Shimotsu | 293/133 |
| 6,854,574 B2 | * | 2/2005 | Yoshida et al. | 188/371 |
| 6,871,888 B2 | | 3/2005 | Yamagiwa | 293/102 |
| 6,905,136 B2 | * | 6/2005 | Vidal et al. | 280/752 |
| 6,908,129 B2 | * | 6/2005 | Shimotsu | 293/133 |
| 6,942,262 B2 | * | 9/2005 | Glasgow et al. | 293/132 |
| 7,008,007 B2 | | 3/2006 | Makita et al. | |
| 7,021,686 B2 | * | 4/2006 | Glasgow et al. | 293/132 |
| 7,070,217 B2 | * | 7/2006 | Longo | 293/132 |
| 7,182,191 B2 | * | 2/2007 | Scott et al. | 188/372 |
| 7,240,933 B2 | * | 7/2007 | Glasgow et al. | 293/132 |
| 7,357,445 B2 | * | 4/2008 | Gross et al. | 296/187.09 |
| 7,404,474 B2 | * | 7/2008 | Yamaki et al. | 188/376 |
| 2003/0209915 A1 | * | 11/2003 | Yoshida | 293/133 |
| 2004/0060790 A1 | * | 4/2004 | Wu et al. | 188/377 |
| 2005/0110285 A1 | | 5/2005 | Glasgow et al. | |
| 2006/0125251 A1 | * | 6/2006 | Glasgow et al. | 293/132 |
| 2007/0181393 A1 | * | 8/2007 | Suzuki | 188/377 |
| 2007/0236025 A1 | * | 10/2007 | Glasgow et al. | 293/133 |

FOREIGN PATENT DOCUMENTS

| | | |
|---|---|---|
| DE | 4302878 | 8/1993 |
| DE | 4302879 | 8/1993 |
| DE | 4226786 | 2/1994 |
| DE | 4239460 | 5/1994 |
| DE | 4401865 | 8/1994 |
| DE | 4316164 | 11/1994 |
| DE | 10042221 | 8/2001 |
| EP | 055733 | 9/1993 |
| JP | 5440436 | 3/1979 |

| | | | | | | |
|---|---|---|---|---|---|---|
| JP | 58089475 | 5/1983 | | JP | 2001138841 | 5/2001 |
| JP | 4243643 | 8/1992 | | JP | 2003160011 | 6/2003 |
| JP | 04310477 | 11/1992 | | JP | 2005162027 | 6/2005 |
| JP | 6211091 | 8/1994 | | WO | WO9606288 | 2/1996 |
| JP | 07101354 | 4/1995 | | | | |
| JP | 1178732 | 3/1999 | | * cited by examiner | | |

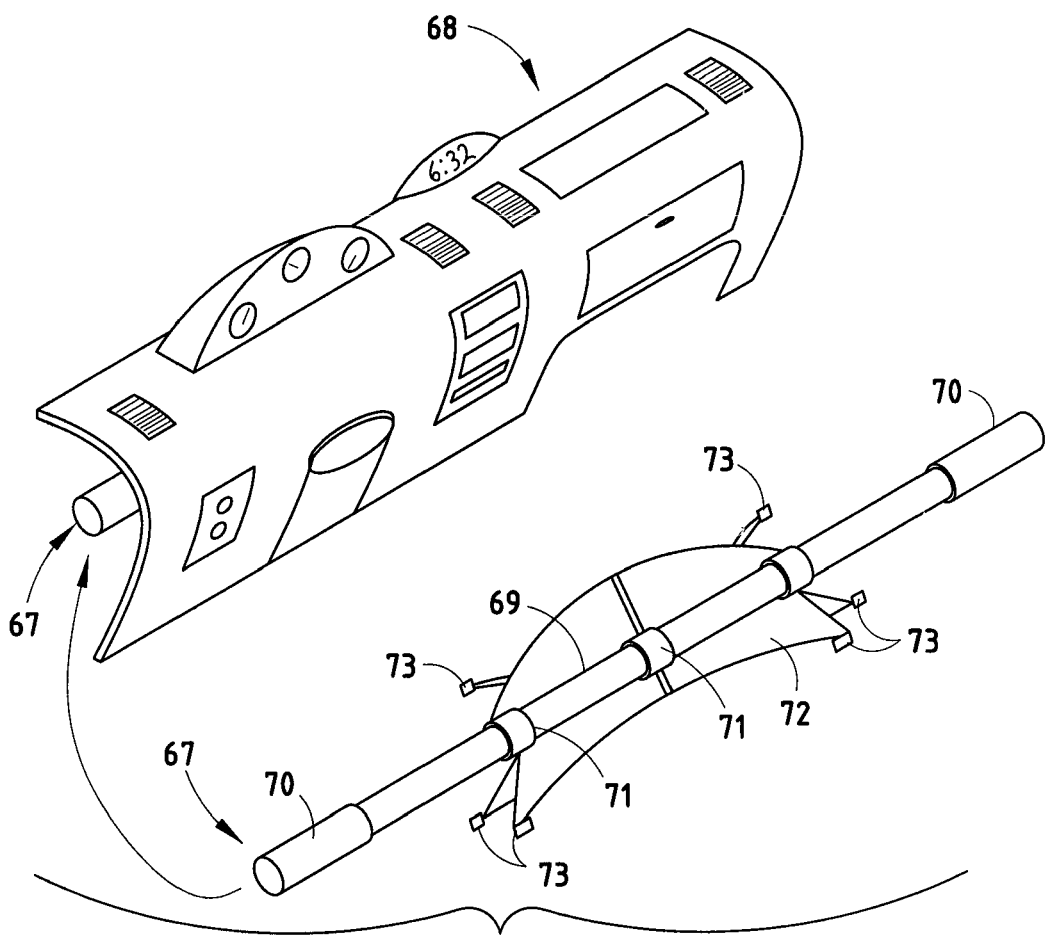
FIG. 22
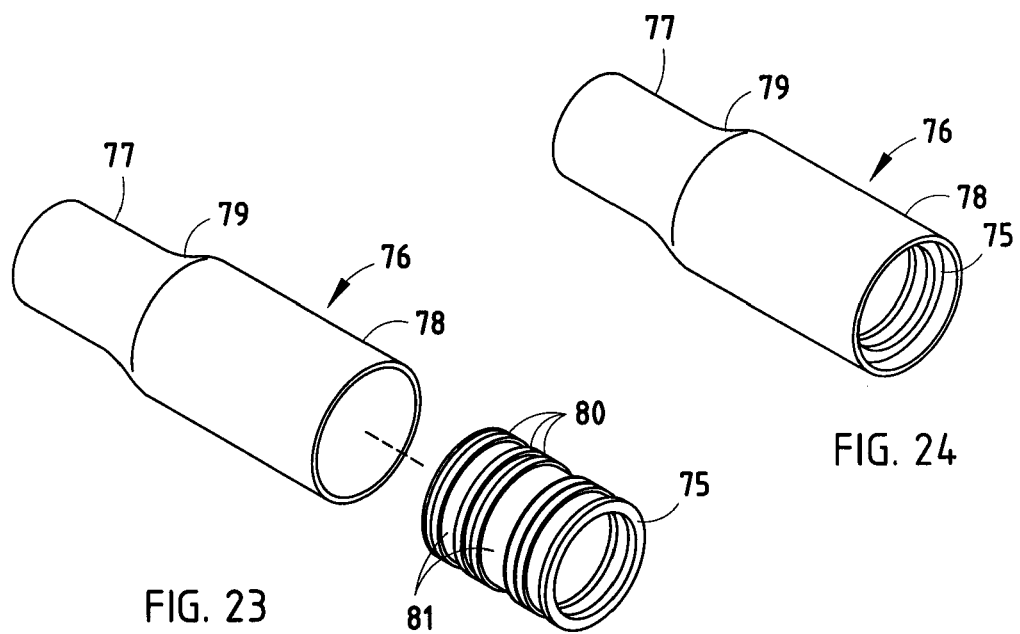
FIG. 23
FIG. 24

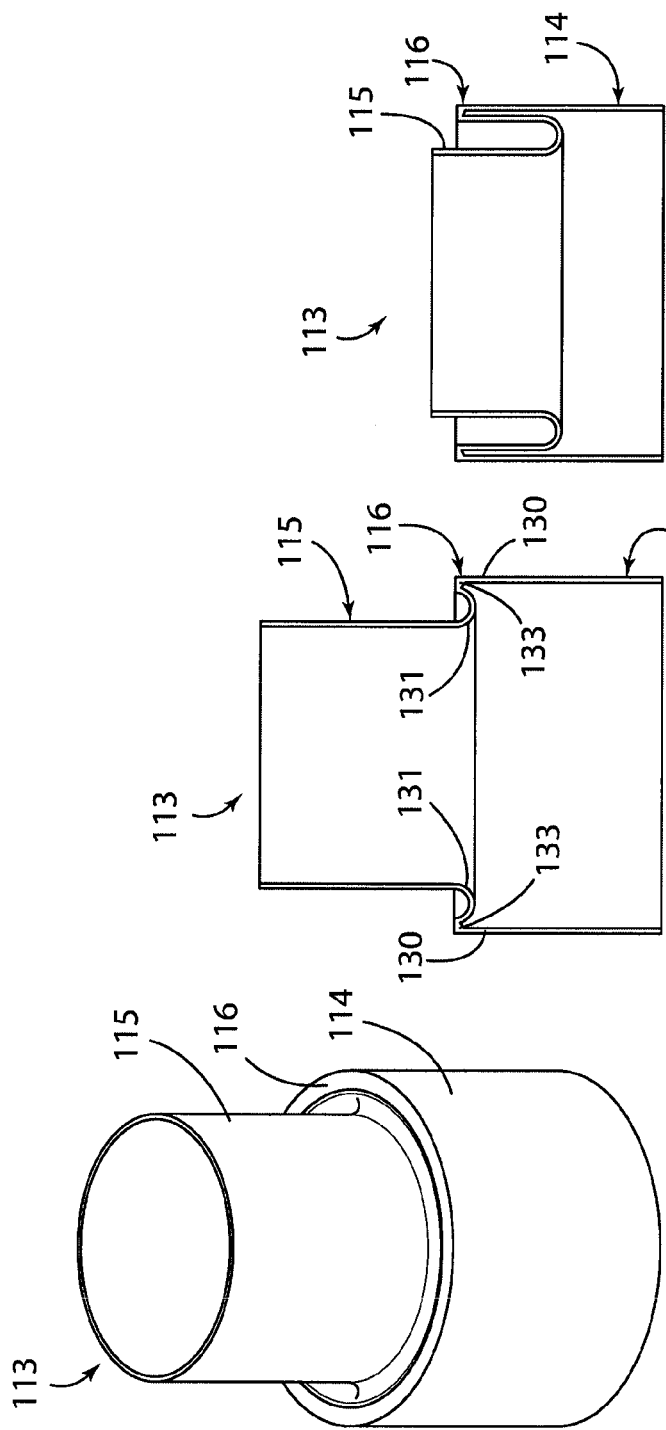

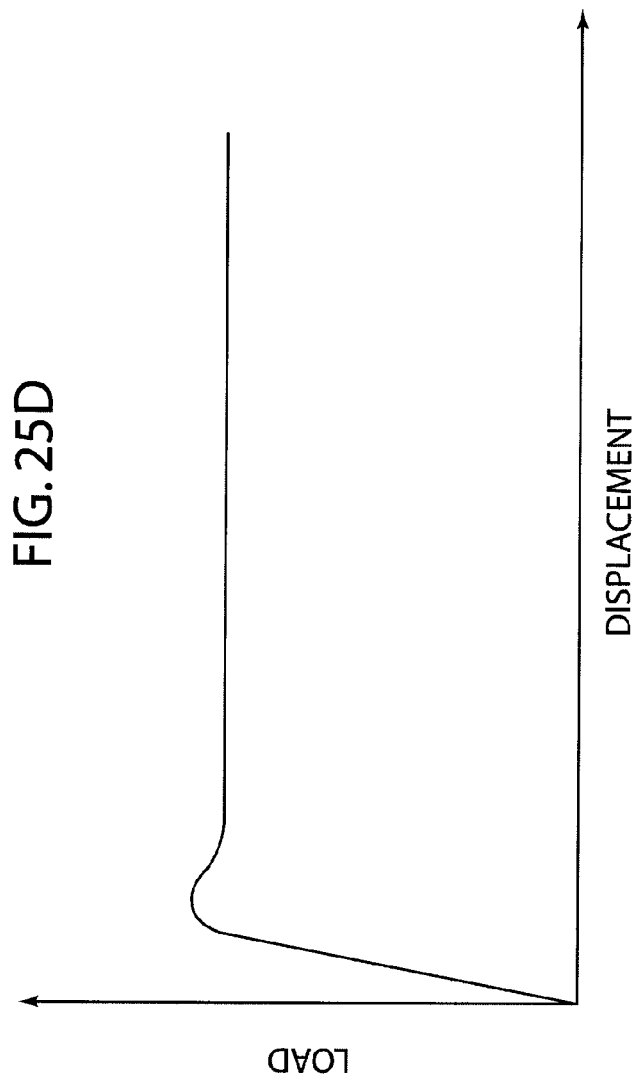

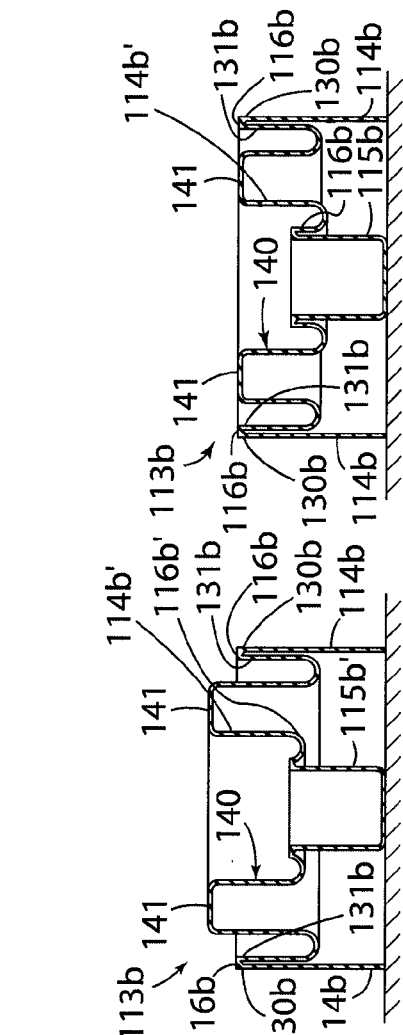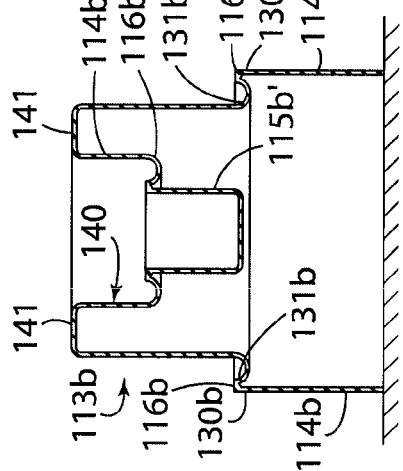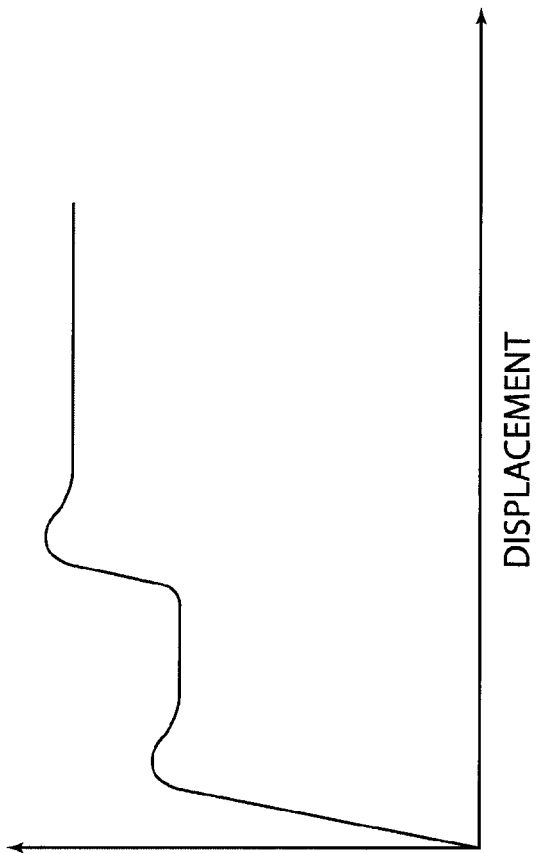
FIG. 27A
FIG. 27B
FIG. 27C
FIG. 27D

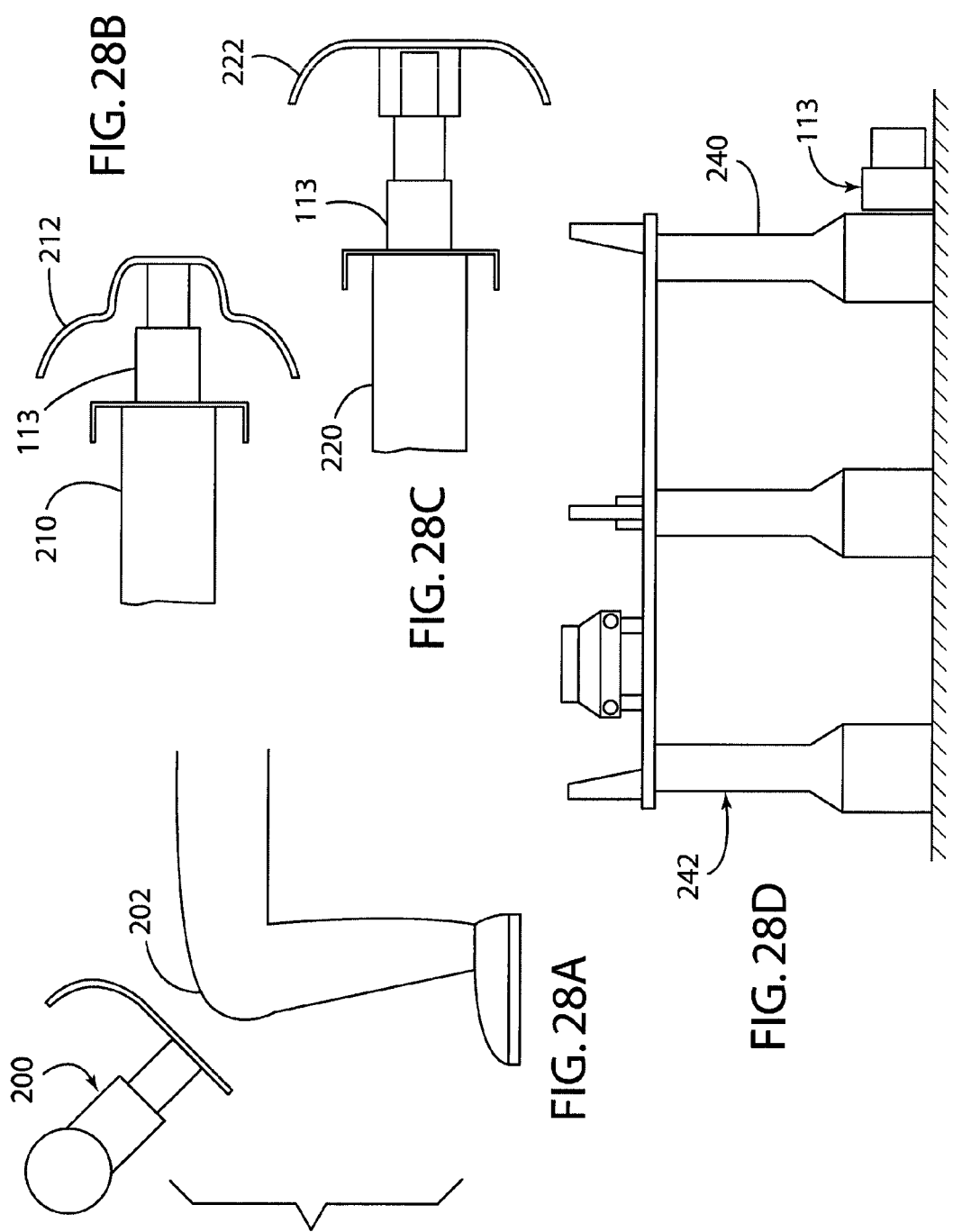

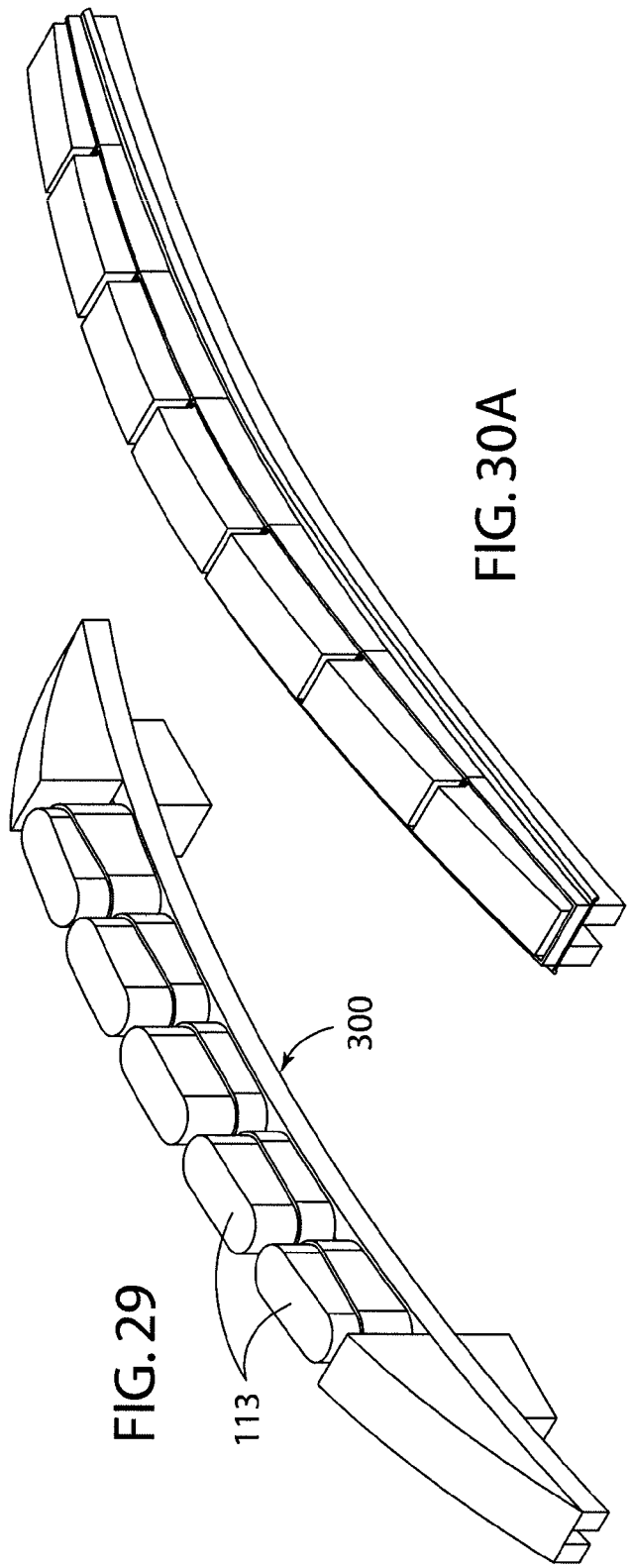
FIG. 29
FIG. 30A
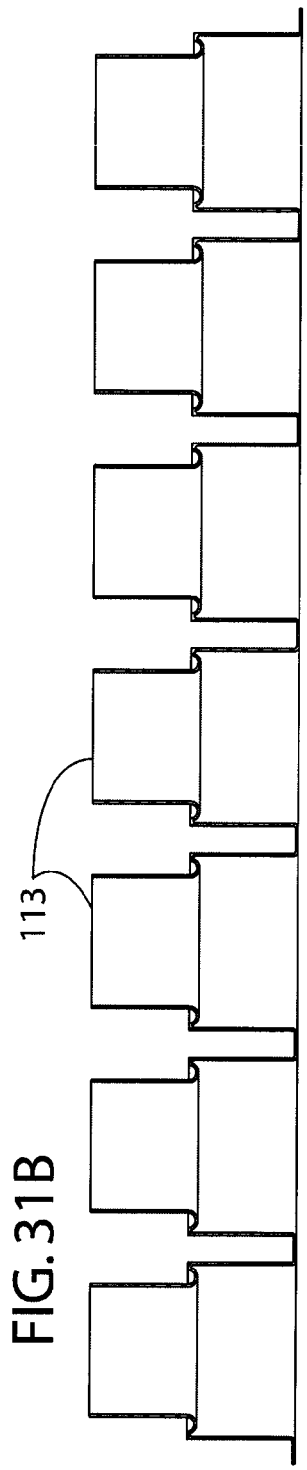
FIG. 31B

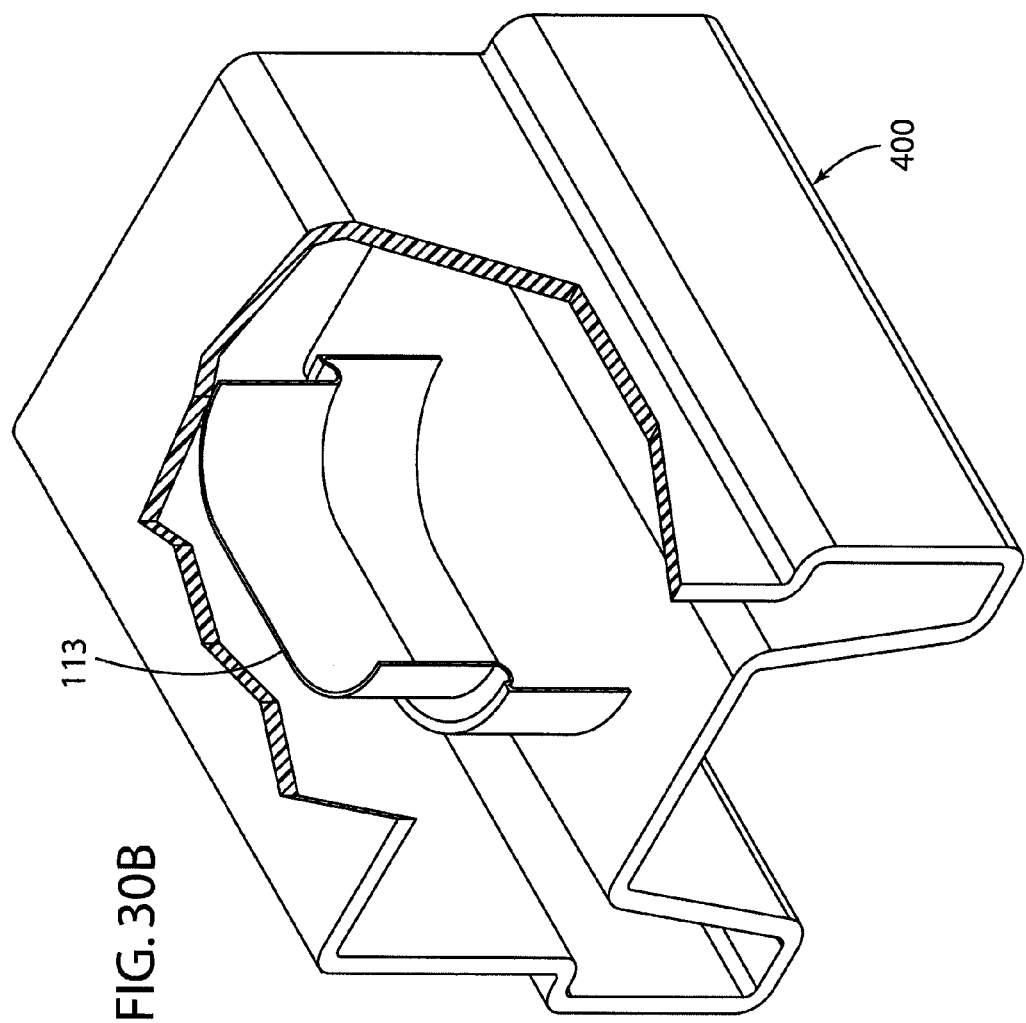

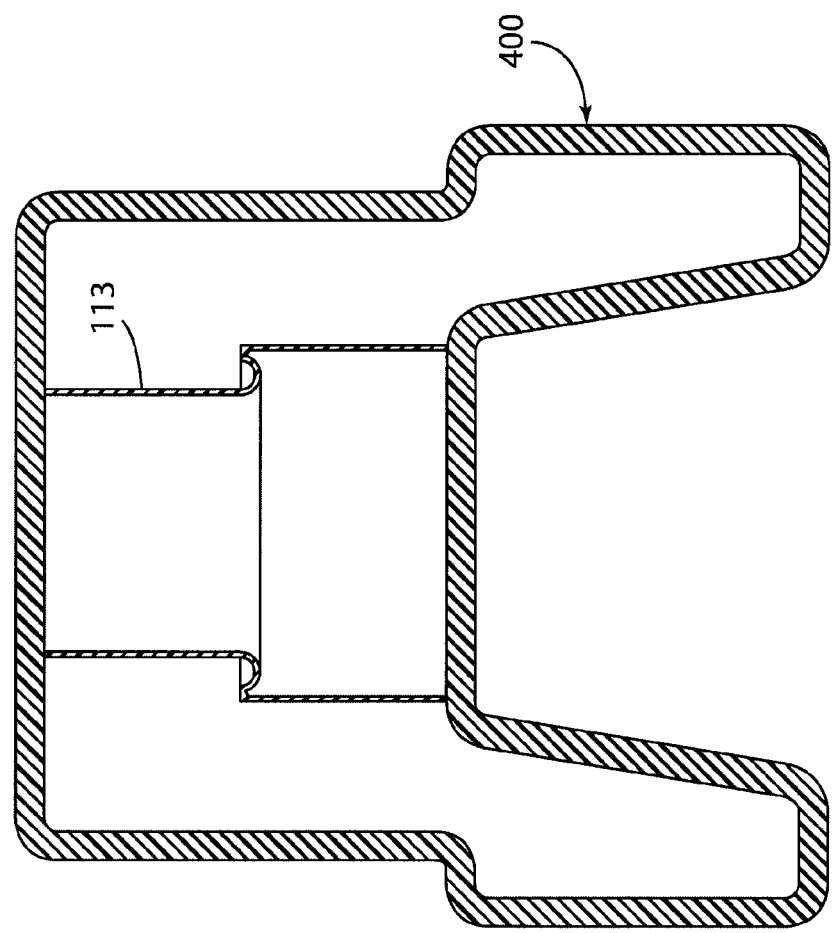

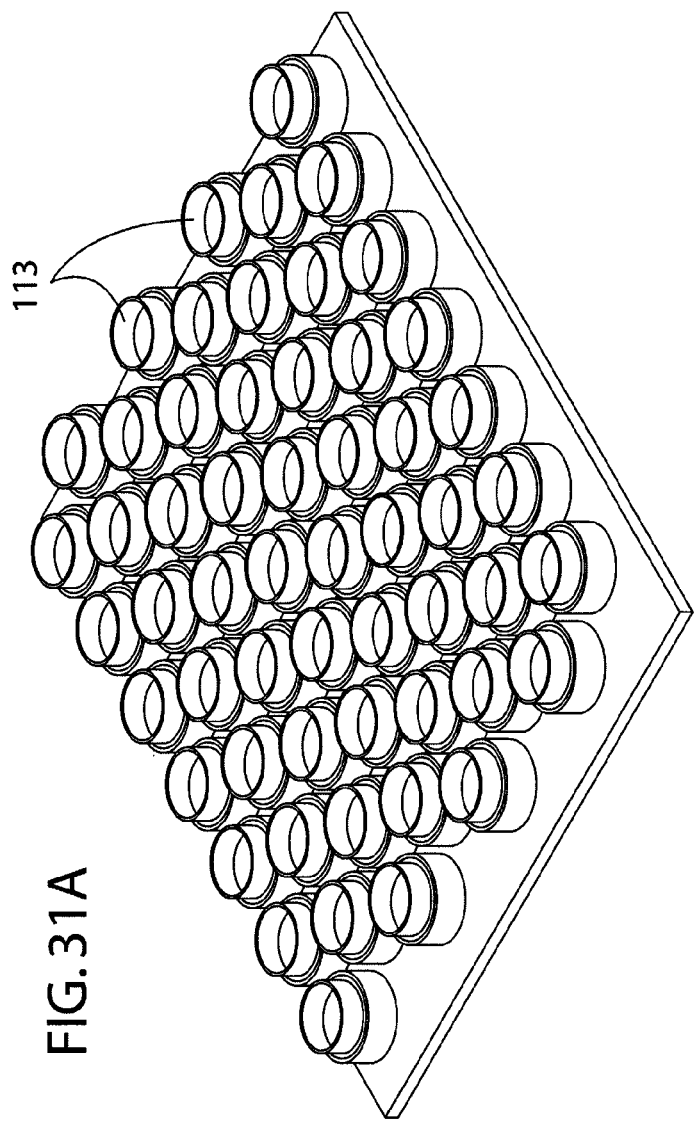

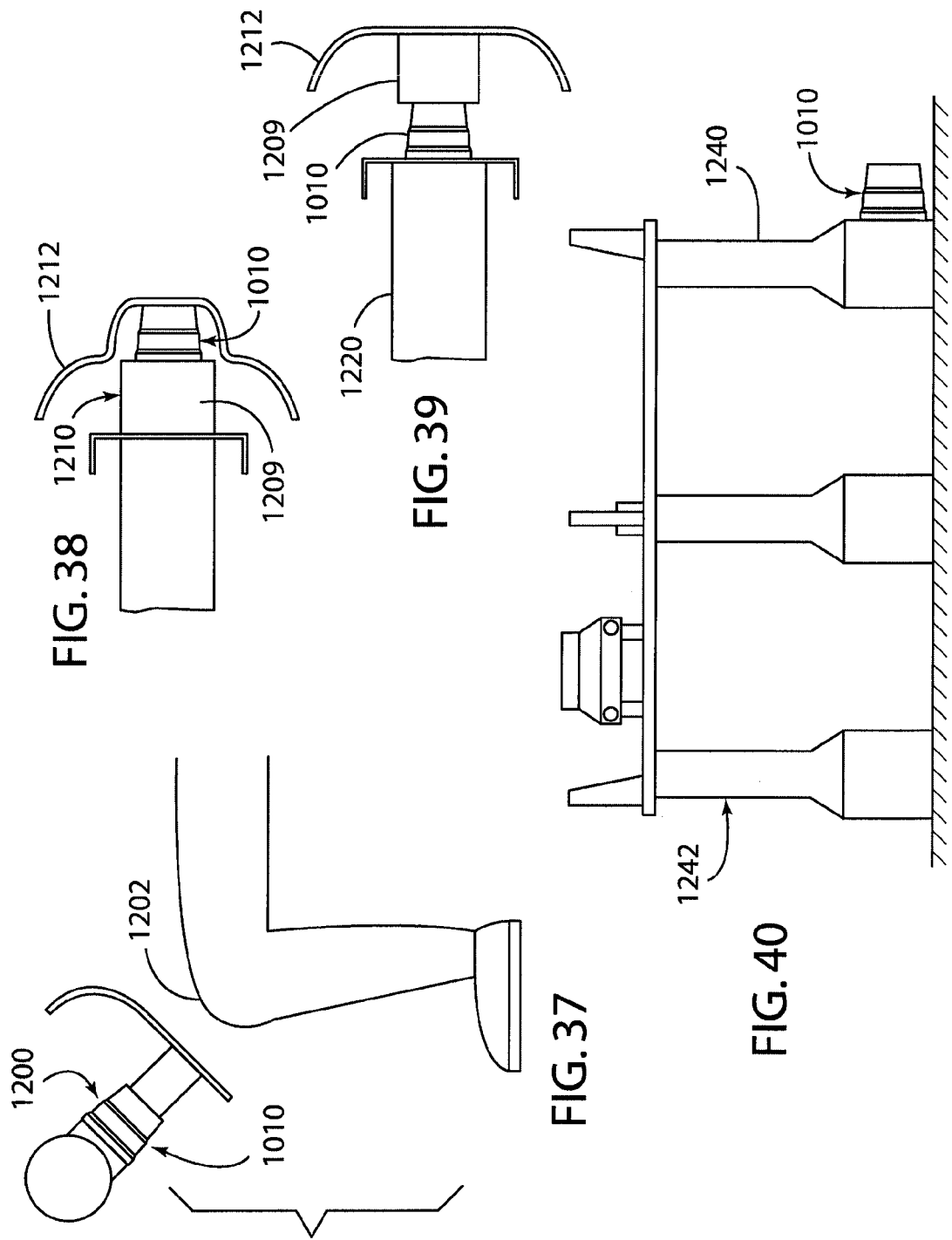

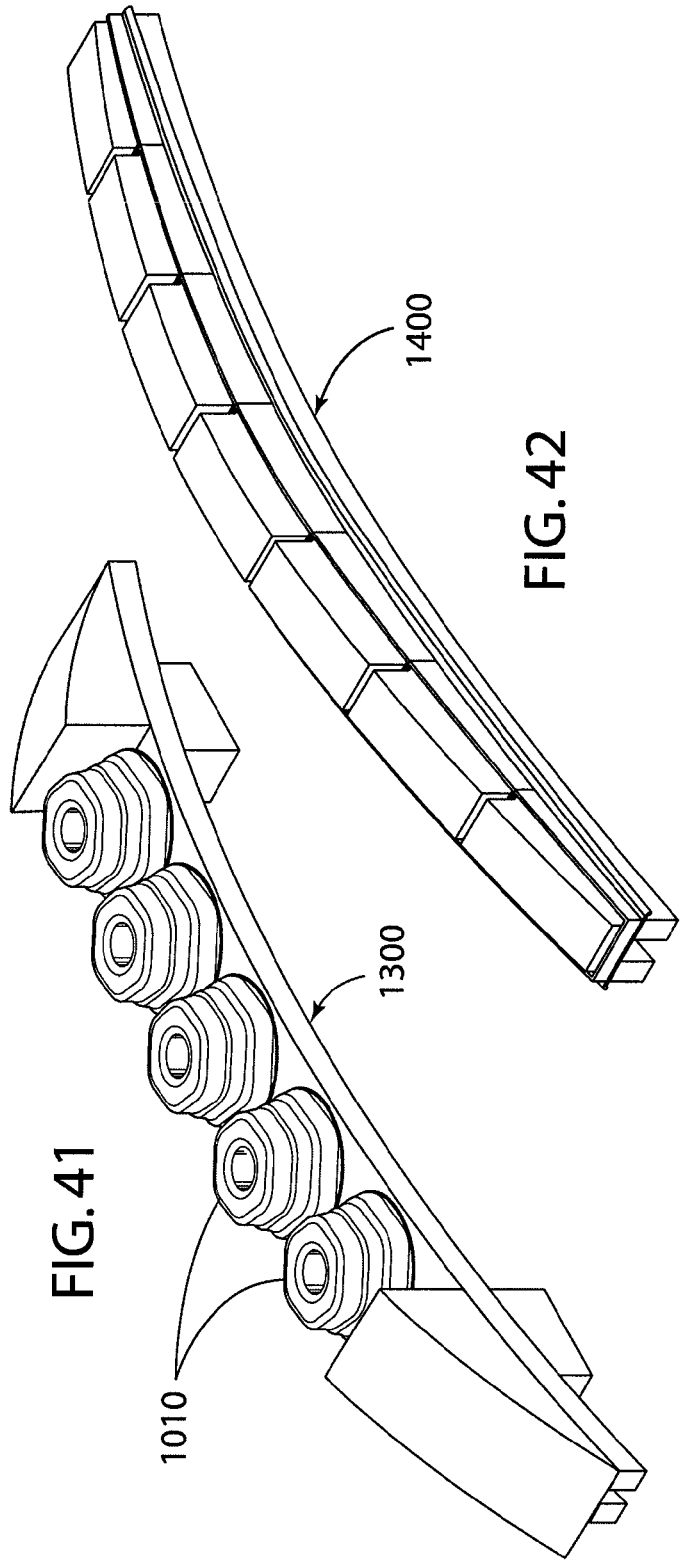
FIG. 41
FIG. 42
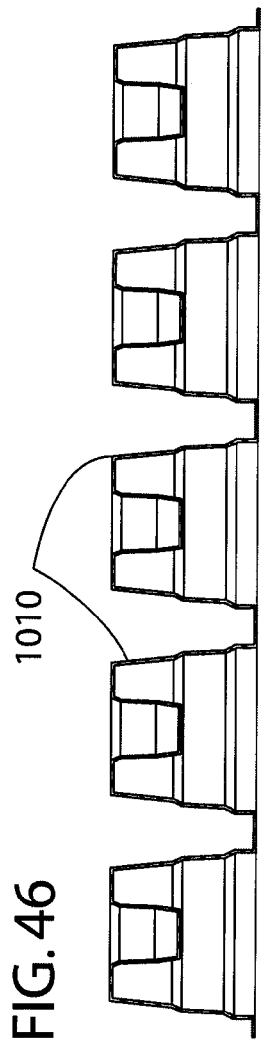
FIG. 46

ENERGY MANAGEMENT BEAM

CROSS-REFERENCE TO RELATED APPLICATIONS

This application is a continuation-in-part of U.S. application Ser. No. 11/220,881, filed Sep. 7, 2005 now U.S. Pat. No. 7,393,029 and entitled PLASTIC ENERGY MANAGEMENT BEAM, which claims the benefit of U.S. Provisional Application No. 60/607,677 entitled PLASTIC ENERGY MANAGEMENT BEAM, which was filed Sep. 7, 2004, the entire contents of both of which are hereby incorporated herein by reference. This application also claims the benefit of U.S. Provisional Application No. 60/751,522 entitled ENERGY MANAGEMENT SYSTEM, which was filed Dec. 19, 2005, and U.S. Provisional Application No. 60/793,069 entitled ENERGY MANAGEMENT SYSTEM, which was filed Apr. 19, 2006, the entire contents of both of which are hereby incorporated herein by reference.

U.S. application Ser. No. 11/220,881, filed Sep. 7, 2005 and entitled PLASTIC ENERGY MANAGEMENT BEAM, is a continuation-in-part of U.S. application Ser. No. 10/997,332, filed Nov. 24, 2004 now U.S. Pat. No. 7,021,686 and entitled TUBULAR ENERGY MANAGEMENT SYSTEM FOR ABSORBING IMPACT ENERGY, which is a continuation of U.S. application Ser. No. 10/648,757, filed Aug. 26, 2003 now U.S. Pat. No. 6,942,262 and entitled TUBULAR ENERGY MANAGEMENT SYSTEM FOR ABSORBING IMPACT ENERGY, which is a continuation-in-part of application Ser. No. 09/964,914, filed on Sep. 27, 2001, now U.S. Pat. No. 6,648,384, the entire contents of all of which are incorporated herein by reference. U.S. application Ser. No. 11/220,881, filed Sep. 7, 2005 and entitled PLASTIC ENERGY MANAGEMENT BEAM is also a continuation-of-part of U.S. application Ser. No. 10/808,127, entitled ENERGY MANAGEMENT BEAM, which was filed on Mar. 24, 2004 now U.S. Pat. No. 7,407,219, the entire contents of which are hereby incorporated herein by reference. Finally, U.S. application Ser. No. 11/220,881, filed Sep. 7, 2005 and entitled PLASTIC ENERGY MANAGEMENT BEAM is also a continuation-of-part of PCT Application No. PCT/US03/39803 entitled BUMPER SYSTEM INCORPORATING THERMOFORMED ENERGY ABSORBER, which was filed on Dec. 15, 2003, and which claimed priority to U.S. Application Ser. No. 60/484,712 filed Jul. 3, 2003, the entire contents of both of which are incorporated herein by reference.

BACKGROUND

The present invention relates to energy-management systems configured to absorb significant impact energy in a consistent and predictable manner during an impact stroke, including energy absorbers made of polymeric materials.

The federal government, insurance companies, and agencies, associations, and companies concerned with vehicle safety have established standardized impact tests that vehicle bumper systems must pass. Bumper mounts and crush towers are commonly used to support bumper bars on vehicle frames and often are used to absorb energy during a vehicle impact. Several characteristics are beneficial for "successful" bumper mounts and crush towers. It is desirable to manufacture bumper mounts and crush towers that provide consistent and predictable impact strength within a known narrow range, so that it is certain that the bumper systems on individual vehicles will all pass testing. This lets manufacturers make a safer vehicle and also lets them more precisely optimize their bumper systems to reduce excess weight and to utilize lower cost materials. More specifically, it is desirable to manufacture bumper mounts and crush towers that provide a consistent force-vs-deflection curve, and to provide a consistent energy absorption-vs-time curve, and to provide a consistent and predictable pattern of collapse. This lets vehicle manufacturers know with certainty how much deflection is created with any given impacting force, and how much energy is absorbed at any point during an impact or vehicle collision. In turn, this allows vehicle manufacturers to design enough room around the bumper system to permit non-damaging impact without wasting space to compensate for product variation and to provide enough support to the bumper system on the vehicle frame. The force-versus-deflection curve has several important ranges at which the crush tower changes from elastic deformation to permanent deformation to total collapse and bottoming out. It is important that these various points of collapse be predictable to assure that substantial amounts of energy are absorbed before and during collapse, and also to assure that collapse occurs before excessive loads are transferred through the bumper system into the vehicle and its passengers.

In addition to the above, bumper development programs require long lead times, and it is important that any crush tower be flexible, adaptable, and "tunable" so that it can be modified and tuned with predictability to optimize it on a given vehicle model late in a bumper development program. Also, it is desirable to provide a crush tower design that can be used on different bumper beams and with different bumper systems and vehicle models, despite widely varied vehicle requirements, so that each new bumper system, although new, is not a totally untested and "unknown" system.

Some tubular crush towers are known for supporting bumper beams in a bumper system. In one type, two stamped half shells are welded together. However, this process generates raw material scrap. Also, the welding process is a secondary operation that adds to manufacturing overhead costs. Further, the welded crush towers are subject to significant product variation and significant variation in product impact strength, force-versus-deflection curves, energy absorption curves, and crush failure points.

Some crush towers use stronger materials than other crush towers. However, as the strength of a crush tower is increased, there is a tendency to transmit higher and higher loads from the bumper beam directly into the vehicle frame. This is often not desirable. Instead, it is desirable that the tower itself predictably crush and collapse and absorb a maximum of energy over a distributed time period. In particular, crush towers that are very high in strength will tend to transmit undesirably high load spikes from the bumper beam to the vehicle frame. This is often followed by a catastrophic collapse of the crush tower where very little energy is absorbed and where the energy absorption is not consistent or predictable from vehicle to vehicle. Also, it results in premature damage to a vehicle frame. It is particularly important that a crush tower be designed to flex and bend material continuously and predictably over the entire collapsing stroke seen by the crush tower during a vehicle crash. At the same time, a design is desired permitting the use of ultra-high-strength materials, such as high-strength low alloy (HSLA) steels or ultra-high-strength steels which have a very high strength-to-weight ratio. As persons skilled in the art of bumper manufacturing know, the idea of simply making a crush tower out of a stronger material is often a poor idea, and in fact, often it leads to failure of a bumper system due to transmission of high impact loads and load spikes to the vehicle frame, and also to problems associated with insufficient energy absorption.

Vehicle frames, like bumper mounts and crush towers, are preferably designed to manage impact energy, both in terms of energy absorption and energy dissipation. This is necessary to minimize damage to vehicle components, and also is necessary to minimize injury to vehicle passengers. Like bumper mounts and crush towers, vehicle frames have long development times, and further, they often require tuning and adjustment late in their development. Vehicle frames (and frame-mounted components) have many of the same concerns as bumper mounts and crush towers, since it is, of course, the vehicle frame that the mounts and crush towers (and other vehicle components) are attached to.

More broadly, an energy absorption system is desired that is flexible, and able to be used in a wide variety of circumstances and applications. It is preferable that such an energy absorption system be useful both in a bumper system, and also in vehicle frames (longitudinal and cross car), and other applications, as well as in non-vehicle applications. Notably, it is important to control energy absorption even in components made of polymeric materials. For example, injection molded and thermoformed energy absorbers are often used in vehicle bumper systems, such as by placing the polymeric energy absorber on a face of a tubular metal reinforcement beam. It is also important to control initial energy absorption, especially as bumpers are made to improve pedestrian safety during impact by a vehicle.

Accordingly, an energy management system is desired solving the aforementioned problems and having the aforementioned advantages. In particular, an energy management system is desired that provides consistent impact strength, consistent force-vs-deflection curves, consistent energy absorption (for elastic and permanent deformation), and consistent collapse points and patterns, with all of this being provided within tight/narrow ranges of product and property variation. Also, a cost-competitive energy management system is desired that can be made with a reduced need for secondary operations and reduced need for manual labor, yet that is flexible and tunable.

SUMMARY OF THE INVENTION

An aspect of the present invention is to provide an energy management tube adapted to reliably and predictably absorb substantial impact energy when impacted longitudinally. The energy management tube comprises an outer first tube section and an inner second tube section, with the inner second tube section being at least partially located within the outer first tube section, and with the outer first tube section having a stepped outer surface. The energy management tube also comprises at least one spanning section connecting a first outer end of the outer first tube section to a first inner end of the inner second tube section. The outer first tube section is longer than the inner second tube section, whereby, upon undergoing a longitudinal impact, the outer first tube section crushes predictably and sooner than the inner second tube section upon the energy management tube receiving forces from the longitudinal impact, to thereby create a first energy absorption level during crushing of the outer first tube section alone and a second energy absorption level during crushing of the outer first tube section and the inner second tube section.

Another aspect of the present invention is to provide a method of making an energy management tube adapted to reliably and predictably absorb substantial impact energy when impacted longitudinally. The method comprises forming an outer first tube section and an inner second tube section, with the inner second tube section being at least partially located within the outer first tube section, with the outer first tube section being longer than the inner second tube section, and with the outer first tube section having a stepped outer surface. The method also comprises connecting a first outer end of the outer first tube section to a first inner end of the inner second tube section with at least one spanning section, crushing the outer first tube section predictably and sooner than the inner second tube section upon the energy management tube receiving forces from a longitudinal impact, creating a first energy absorption level during crushing of the outer first tube section alone, and creating a second energy absorption level during crushing of the outer first tube section and the inner second tube section.

These and other aspects, objects, and features of the present invention will be understood and appreciated by those skilled in the art upon studying the following specification, claims, and appended drawings.

BRIEF DESCRIPTION OF DRAWINGS

FIG. 5 is a perspective view of additional cross-sectional shapes that the energy management tube can take on;

FIG. 22 is a perspective view of a cross car beam used to support an instrument panel; and FIGS. 23-24 are perspective views showing a crushable support member exploded from an energy management tube in FIG. 23 and positioned within the tube in FIG. 24.

FIG. 25A is a front perspective view of a plastic energy management tube (EMT) of the present invention.

FIG. 25B is a cross-sectional view of the plastic EMT of the present invention in an initial position.

FIG. 25C is a cross-sectional view of the plastic EMT of the present invention after impact.

FIG. 25D is a graph showing a load v. displacement chart for the plastic EMT of the present invention.

FIG. 27A is a cross-sectional view of a third embodiment of a plastic EMT of the present invention in an initial position.

FIG. 27B is a cross-sectional view of the third embodiment of a plastic EMT of the present invention in a first crush position.

FIG. 27C is a cross-sectional view of the third embodiment of a plastic EMT of the present invention in second crush position.

FIG. 27D is a graph showing a load v. displacement chart for the third embodiment of the plastic EMT of the present invention.

FIG. 28A illustrates a first use of the plastic EMT of the present invention.

FIG. 28B illustrates a second use of the plastic EMT of the present invention.

FIG. 28C illustrates a third use of the plastic EMT of the present invention.

FIG. 28D illustrates a fourth use of the plastic EMT of the present invention.

FIG. 29 is a perspective view of a first embodiment of a bumper beam employing the plastic EMT of the present invention.

FIG. 30A is a perspective view of a second embodiment of a bumper beam employing the plastic EMT of the present invention.

FIG. 30B is a perspective cut-away view of the second embodiment of the bumper beam employing the plastic EMT of the present invention.

FIG. 30C is a cross-sectional view of the second embodiment of the bumper beam employing the plastic EMT of the present invention.

FIG. 31A is a perspective view of a headliner employing the plastic EMT of the present invention.

FIG. 31B is a cross-sectional view of the headliner employing the plastic EMT of the present invention taken along the line A-A of FIG. 31A.

FIG. 37 illustrates a first use of the further energy management tube of the present invention.

FIG. 38 illustrates a second use of the further energy management tube of the present invention.

FIG. 39 illustrates a third use of the further energy management tube of the present invention.

FIG. 40 illustrates a fourth use of the further energy management tube of the present invention.

FIG. 41 is a perspective view of a first embodiment of a bumper beam employing the further energy management tube of the present invention.

FIG. 42 is a perspective view of a second embodiment of a bumper beam employing the further energy management tube of the present invention.

FIG. 46 is a cross-sectional view of the headliner employing the further energy management tube of the present invention taken along the line B-B of FIG. 45.

DETAILED DESCRIPTION OF PREFERRED EMBODIMENTS

Figure 1:
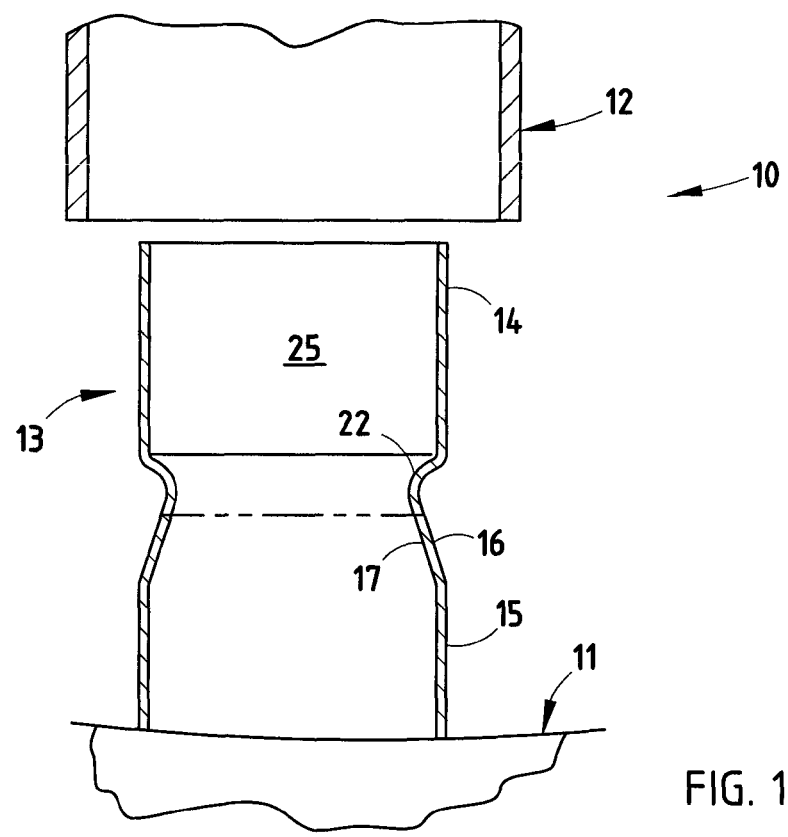
FIG. 1 is a horizontal cross-sectional view of a bumper system including a mounting plate attached to a vehicle frame, a bumper beam, and a crush tower including opposite ends attached to the mounting plate and the bumper beam.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It is noted that the present invention can include utilizing the energy management technology (EMT) in thermoplastic and thermoset polymeric materials, with and without filler and reinforcement materials such as talc, glass fibers, and the like.

A vehicle bumper system 10 (FIG. 1) includes a vehicle front bumper beam 11 with a mounting bracket, a vehicle frame including a rail mounting plate 12, and a crush tower 13 mounted between the bracket and the plate 12. The crush tower 13 comprises a tube made of a continuous contiguous material, such as high-strength heat-treatable steel. The tube has first and second ring sections 14 and 15 connected by an interconnecting section 16. The interconnecting section 16 has a frustoconically-shaped portion 17 forming a funnel-shaped ramp. In one mode, the first ring section 14 is heat-treated to a high material strength, such as about 140 KSI tensile strength, which is substantially higher than the second ring section 15, which is kept at about 60 KSI tensile strength. It is contemplated that the tensile strength of the first ring section 14 should be above the tensile strength of the second ring section 15 by a significant amount, such as about 10%, but preferably should be about double the tensile strength or about 60 KSI above it. This arrangement provides the stiffness necessary for the ring section 14 to telescope onto the ring section 15 and to provide bunching at the frustoconically-shaped portion 17 of the interconnecting section 16.

Figures 2, 3:
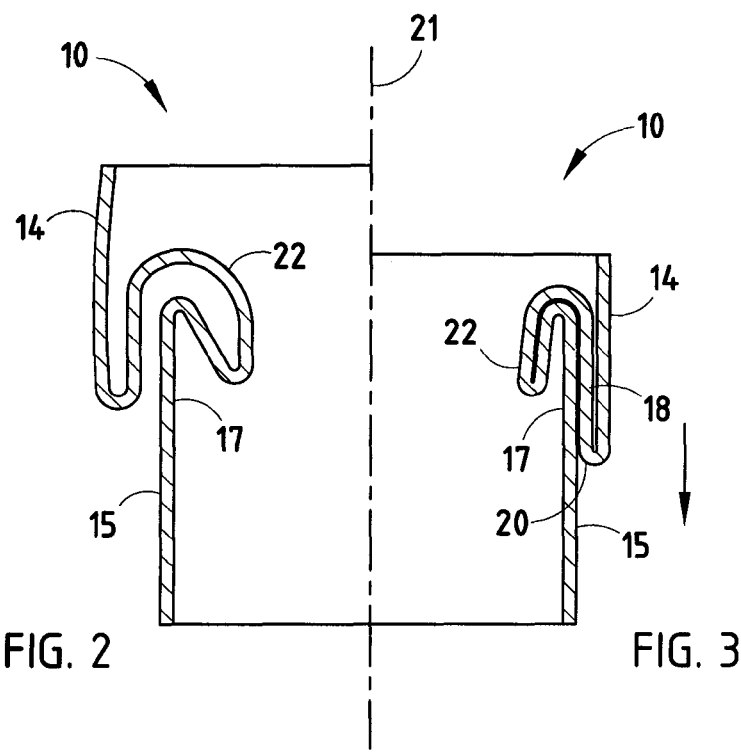
FIG. 2 is a view similar to FIG. 1, but with the crush tower collapsed a first (relatively short) distance.
FIG. 3 is a view similar to FIG. 2, but with the crush tower collapsed a second (longer) distance.

By this arrangement, upon the bumper system 10 receiving an end impact parallel a length of the crush tower 13, the first and second ring sections 14 and 15 telescopingly collapse into each other with a predictable and consistent multi-phase deformation sequence where a third ring or small radius pinched section 18 (FIG. 2) begins to form and then does form (FIG. 3) between the first and second ring sections 14 and 15. Once the third ring 18 is fully formed, as limited by a length of the interconnecting section 16, material begins to buckle and bunch up at location 20 under the "hook" formed by the section 22. It is contemplated that additional ring sections and interconnecting sections could be provided if a vehicle model has enough room, and additional energy absorption is desired before final bottoming out of the crush tower.

Figure 4:
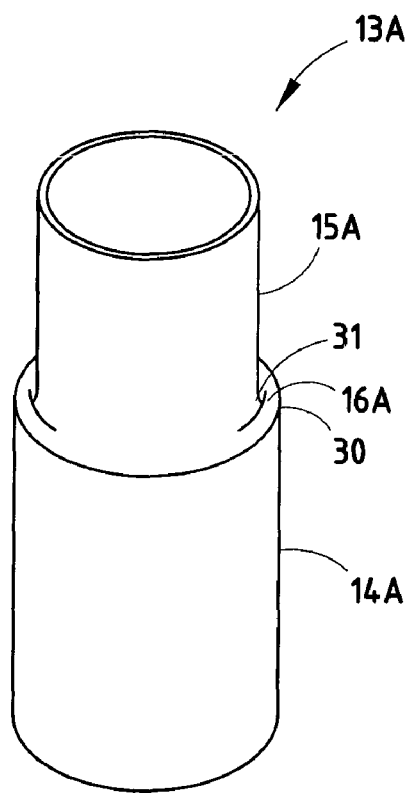
FIG. 4 is a side view of an energy management tube embodying the present invention.
Figure 14:
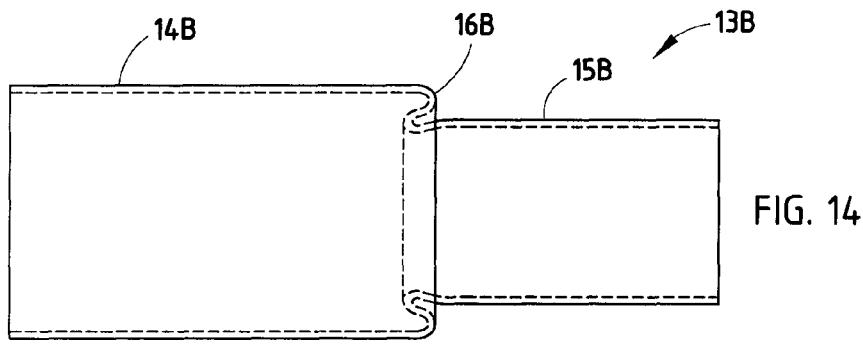
FIGS. 14-15 are side and longitudinal cross-sectional views of a modified energy management tube, the tube having an inwardly flared end portion of its intermediate tube section adjacent its small diameter tube section.

The illustrated bumper beam 11 is a tubular beam and is known in the art. For example, see Sturrus U.S. Pat. Nos. 5,092,512 and 5,813,594. However, it is contemplated that the beam could be an open non-tubular beam as well. Also, the bumper beams can be linear or curved. Depending on their shapes, mounting brackets or plates can be used to provide a relatively flat mounting surface on the bumper adapted for attachment to a crush tower. (See FIG. 14 of U.S. Pat. No. 5,092,512 and FIG. 4 of U.S. Pat. No. 5,813,594.) Similarly, at the vehicle-connected end of a crush tower, a variety of different means can be used to provide a point of attachment for securing the crush towers to a vehicle frame.

The present inventive crush tower 13 is made from a single tubular shape. It is contemplated that the tubular shape initially will be rollformed and welded into a permanent tube to have a constant and circular cross section, with uniform walls having a constant thickness. Nonetheless, it is contemplated that non-circular tubes could also be used in the present invention.

After the tube is formed and cut to a desired length, the interconnecting section 16 is rolled or stamped to form an inwardly-deformed frustoconically-shaped portion 17 (shaped like a funnel) having a low angle to a centerline 21 of the tube, and an inwardly-deformed radiused "quick-out" portion 22 having a greater angle to the centerline 21. The illustrated frustoconically-shaped portion 17 has a relatively linear funnel-shaped segment so that it forms a stiff ramp for guiding the ring section 15 into the ring section 14 during impact. Also, the quick-out portion 22 is radiused and angled so that it undergoes a bending force causing it to roll into an inwardly deformed hook shape (see FIG. 2). The inwardly deformed material forms a uniform columnar support for the section 15 that maintains a columnar strength of the tube section 15. This helps the telescoping action of sections 14 and 15 during impact, as discussed below.

The internal cavity 25 within the crush tower 13 is open and stays open during impact. As a result, a component can be positioned within the cavity 25 without adversely affecting a performance of the crush tower 13. For example, a tow hook bushing can be located within the cavity 25, if desired.

In operation, the crush towers 13 are manufactured by making a tube, such as by rollforming, then rollforming or deforming into the tube the reduced-diameter interconnecting section and then by heat-treating the ring section 14 (and/or sections 15, 17, and 22). A pair of the crush towers 13 are then assembled into a bumper system 10 by attachment to the bumper beam 11, with the crush towers 13 being horizontally and laterally spaced from each other. The bumper system 10 is then attached to a vehicle frame.

During impact, the interconnecting section 16 begins to buckle due to a linear strength of the ring sections 14 and 15 along their centerline 21. In particular, the frustoconically-shaped portion 17 is driven under the quick-out portion 22 as the quick-out portion 22 doubles back upon itself, forming an inwardly-deformed hook-like ring that grips the portion 17. The radius of portion 22 as compared to the rest of the material of portion 17 helps cause this result. This provides a first stage of collapse at a first (lower) level of energy absorption. As the crush tower 13 undergoes further telescoping during a long stroke from a vehicle crash, an end of the interconnecting section 16 is bent over and drawn under the remaining material of ring section 14. The third ring section 18 is formed between the ring sections 14 and 15 as the end of ring section 15 bends and rolls onto an outside surface of tube section 15. This sequential collapse and deforming of the various sections 14-16 and in particular, the rolling of the material of tube section 14 absorbs substantial energy in a very predictable manner and within a relatively narrow range of variation.

It is contemplated that the present crush tower can be made on a rollforming machine from a roll of high-strength low alloy (HSLA) steel. Further, it is contemplated that the roll of steel can be high-strength steel (such as 70 KSI tensile strength), or an ultra-high-strength steel (such as 80 KSI tensile strength or above). If needed, these materials can be annealed in selected areas to improve their elongation properties or to lower their yield strength (such as 60 KSI tensile strength or lower) and/or can be heat-treated in selected areas for increased strength. For example, crush towers having an area at one end with a 60 KSI tensile strength and an area at an opposite end with a 120 KSI strength can be made by either method. The intermediate ring section is preferably about 60 KSI and similar in strength to the lower strength ring section to better assure a good collapse sequence. It is noted that, in the present disclosure, the term "heat treat" is considered to be broader than the term "anneal", and that the term heat treat includes increasing or decreasing material properties through use of heat and thermal means. It is also contemplated that the heat-treating and/or the annealing can be done in-line with the rollforming apparatus and simultaneous with the rollforming as a continuous process. When the step of annealing is done in-line with and simultaneous with the apparatus and roll-forming process, it is beneficial to have the rollformed tubular shape be made so that adjacent crush towers face in opposite directions. For example, where the ring 15 (i.e. the end to be attached to the bumper beam) is annealed from a higher strength to a lower strength, it is beneficial to have two ring sections 15 of adjacent crush towers (i.e. before separation into separated tube sections) be next to each other so that a single annealing heat can be applied over a wider area. This adds efficiency, control, and line speed to the rollforming process and to the annealing process.

MODIFICATION

In the following description, similar components, features, and aspects are identified with the same identification numbers, but with the addition of a letter "A", "B", etc. This is done to reduce redundant discussion.

Figure 5:
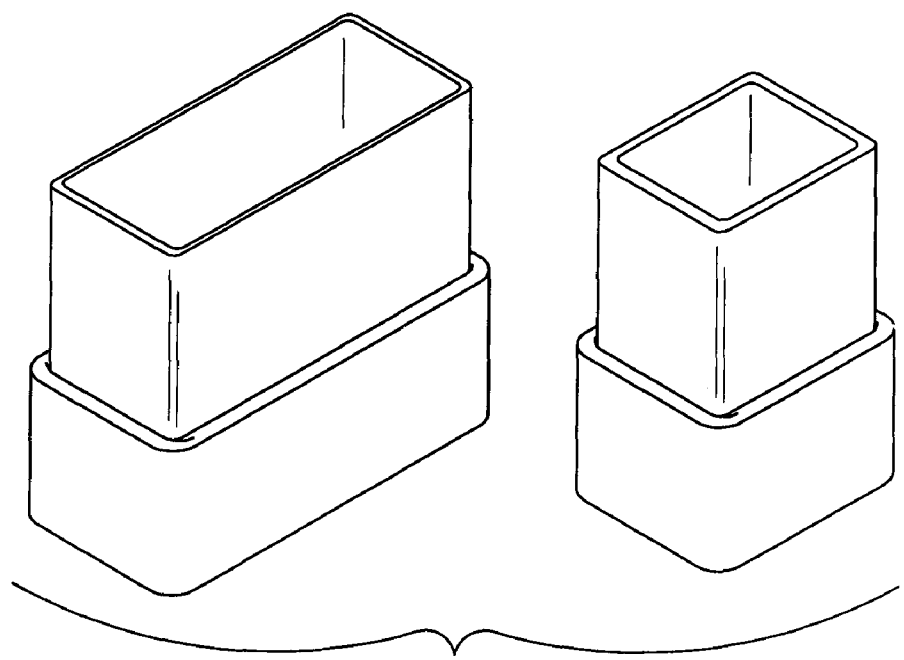

A modified energy management tube 13A (FIG. 4) is provided that is adapted to reliably and predictably absorb substantial impact energy when impacted longitudinally. The energy management tube 13A includes a first tube section 14A, a second tube section 15A that is aligned with the first tube section 14A, and an intermediate tube section 16A with first and second end portions 30 and 31, respectively. The end portions 30 and 31 integrally connect the first and second tube sections 14A and 15A, respectively. The first tube section 14A is dimensionally larger in size than the second tube section 15A, and has a similar cylindrical cross-sectional shape. However, it is noted that the first and second tube sections 14A and 15A can be different shapes including rectangular, square, oval, round, or other geometric shapes. (See FIG. 5.) Further, it is contemplated that the tube sections 14A and 15A may have different cross-sectional shapes along their lengths, especially at locations spaced away from the intermediate tube section 16A where the tube sections 14A and 15A must be adapted to connect to different structures, such as vehicle frame components and the like. (See FIGS. 19-22.) The intermediate tube section 16A has a shape transitioning from the first tube section 14A to the second tube section 15A, and further the first and second end portions 30 and 31 are dissimilar in shape as noted below (FIGS. 9-12).

Figure 6:
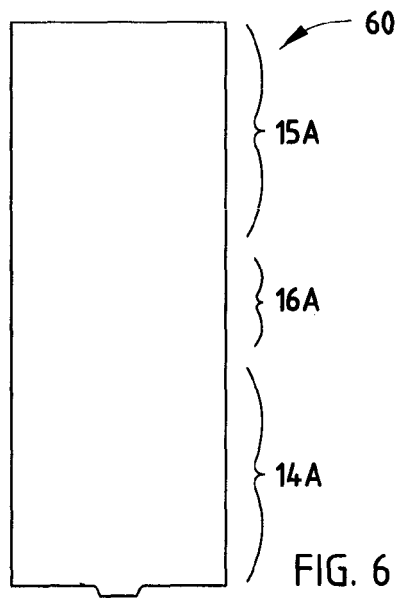
FIGS. 6-8 are side views of a tubular blank with a first diameter (FIG. 6), the tubular blank being compressed to a reduced diameter at one end (FIG. 7) and then deformed longitudinally at an intermediate tube section to take on an S-shaped pre-set (FIG. 8), FIG. 8 showing an energy management tube of the present invention.
Figure 7:
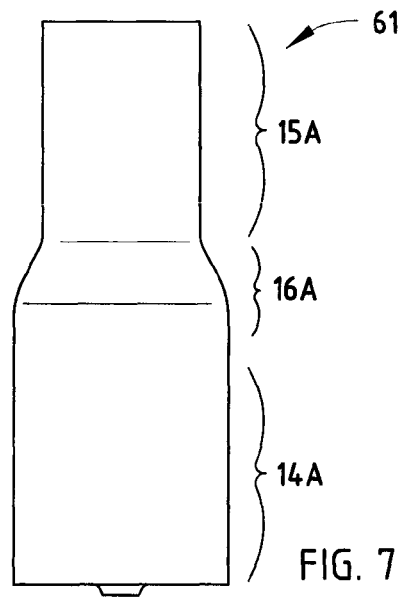
Figure 9:
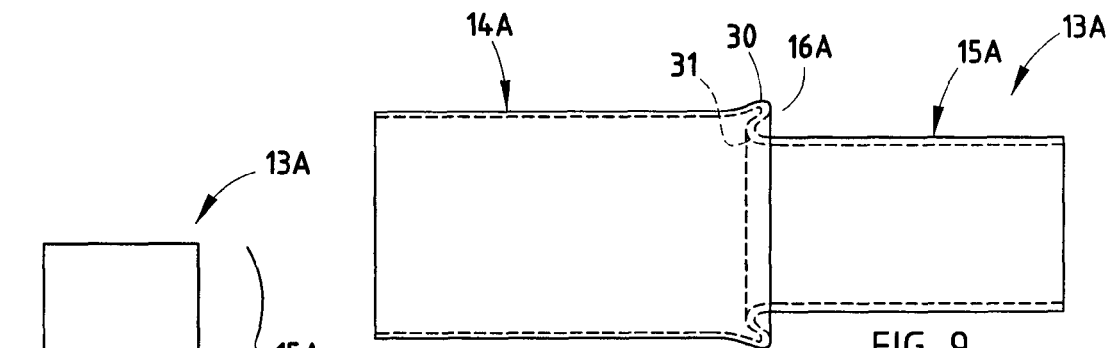
FIGS. 9-11 are side, end, and longitudinal cross-sectional views of the tube of FIG. 8, the tube having an outwardly flared end portion of its intermediate tube section adjacent its large diameter tube section.
Figure 8:
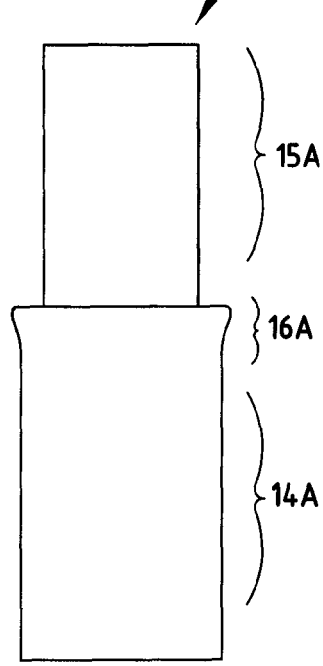
Figure 10:
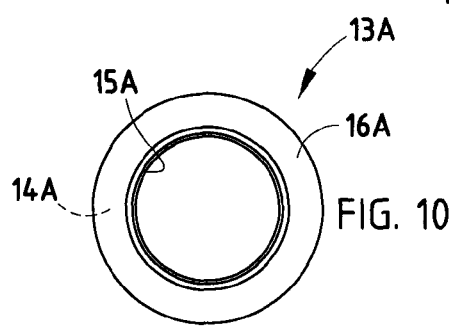

The present energy management tube 13A (FIG. 4) is disclosed as being made from a sheet of annealable steel material with each of the tube sections 14A, 15A, and 16A being integrally formed together as a unit. The wall thickness can be varied as needed to satisfy functional design requirements. For example, for bumper crush towers and/or vehicle frames, the thickness can be about 1.5 mm to 4 mm, depending on material strengths and the specific application requirements of use. It is contemplated that the sheet will initially be made into a continuous long tube by a rollforming machine, and thereafter cut into tubular blanks 60 (FIG. 6) of predetermined lengths. Then, the tubular blanks will have the areas of tube sections 15A and 16A annealed, and then formed to a shape 61 (FIG. 7) where the second tube section 15A is compressed to a reduced diameter, with the intermediate section 16A temporarily taking on a temporary frustoconical shape. It has been determined that it is beneficial to fixture and longitudinally deform the energy management tube 13A to a pre-set condition (FIG. 8), so that the intermediate section 16A takes on a particular shape that avoids high load spikes during initial impact, as noted below. For automotive bumper systems and frame components, it is preferable that the sheet of material be a good, reliable grade of steel, such as structural steel. Steels having greater than about 35 KSI yield strength work very well. Steels that can be heat-treated or annealed to achieve optimal yield and elongation properties in selected areas are also excellent candidates, such as structural steels, or high-strength low-alloy steel (HSLAS) or ultra-high-strength steel (UHSS).

A specific comment about materials is appropriate. As selected materials get stronger and harder, with higher yield strengths, higher tensile strengths and lower elongation values, they often become more sensitive to tight radius and will tend to resist rolling. Instead, they will tend to break, kink, shear, crack, and/or fracture at tight radii. This breaking problem gets worse as the radii approach a thickness dimension of the material. The present invention utilizes outward and inward flaring, clearances, and radii specifically chosen to help deal with this problem. Various grades of steel are known in the art and understood by skilled artisans. The reader's attention is directed to ASTM A1008/A and A1008M-Ola, and also to ASTM A1011A and A1011M-01 a for standardized industry definitions. Structural steels, such as steels having about 25 KSI and above, have strength properties where the quality problems noted above begin to occur. Structural steels are typically a slightly better grade than cold rolled commercial quality steel or hot-rolled commercial quality steel. Nonetheless, especially as they approach 25 to 35 KSI tensile strength, they tend to have problems. It is specifically contemplated that the present invention will work well using structural steels, such as steels having a tensile strength of about 25 KSI or greater, in the above-illustrated energy management tube 13 (and tubes 13A and 13B). The present invention also is well adapted for and works well for stronger materials of 80 KSI and above, and ultra-high-strength steels (UHSS). Where workability and enhanced rolling of material is desired, these steels can be heat treated or annealed to achieve optimal properties at strategic regions along the energy management tubes.

It is noted that the various steels discussed herein are intended to be and are believed to be well understood by persons skilled in the art of steel materials and in the art of rollforming. For the reader's benefit, it is noted that additional information can be obtained from the American Society for Testing and Materials (ASTM). The terms for steels as used herein are intended to be consistent with ASTM standards and definitions. Nonetheless, it is emphasized that the present technology is very flexible and adaptable to work with a wide variety of materials. Accordingly, the various terms are intended to be broadly construed, though reasonably construed.

The present concepts are believed to be particularly useful for HSLA steels, and ultra-high-strength steels (UHSS), such as dual phase steel, tri phase (TRIP) steel, or martensitic materials. The present concepts are also useful for other engineering grade materials, such as aluminum and even softer materials. The present concepts are particularly useful where high strength materials permit weight reduction through reduced wall thicknesses (i.e. gauge reduction). By being heat treatable, the material is inherently more workable and flowable, and/or can be made more workable and flowable in selected areas. For example, this allows a pre-set to be formed in the intermediate tube section 16A with small radii, yet with less risk of developing microcracks and/or macrocracks and/or splitting, less risk of shearing problems and material separation such as shelving, and less risk of other quality defects causing reduced material strength in the area of small-radius bends. The property of being annealed also allows the material to roll without shearing, ripping, or tearing, which is important to achieving maximum energy absorption during impact and longitudinal crush. (See FIG. 13.)

Notably, a performance of the present energy management tube can be adjusted and tuned to meet specific criteria by numerous methods, including by adjustment of the following variables: material thickness, material type, material hardness and yieldability, annealing temperatures and conditions, tube diameter and shapes, the particular rolling radius design and the degree of pre-set, use of crushable inserts positioned within (or outside) the tube sections, and other factors affecting rolling of material, columnar strength, energy absorption, and distribution of stress during a longitudinal crushing impact.

As illustrated in FIGS. 9-12, the first tube section 14A is larger in size than the second tube section 15A. The first tube section 14A includes an outer surface defining a tubular boundary 32. The tubular boundary 32 matches a cross-sectional shape of the first tube section 14A at an area near the first end portion 30. The first end portion 30 includes a circumferentially-continuous band of tightly deformed material 34 that is flared outward radially beyond the boundary 32, such as at a minimum angle of about 25°. This tightly deformed material 34 defines a small radius that effectively forms a "pinched" area that resists rolling of the material. Also, there is some work hardening of the material at the small radius. The small radius (on its concave surface) is preferably not less than about 0.5 times a thickness of the material of the first end portion 30. Thus, it adequately resists a tendency to shear or crack. The reasons for the deformed material 34 resisting rolling are numerous and subtle. It is believed that the tight "small" radius along with the flared shape forms a uniform ringed support for the first tube section 14A that acts to support and maintain a columnar strength of the first tube section upon longitudinal impact. When longitudinally stressed, the tightly deformed material 34 resists rolling of the material of first end portion 30 and of the first tube section 14A.

Contrastingly, the second end portion 31 (FIG. 12) has a deformed material 35 defining a relatively larger radius (on its concave surface), such as at least about 1.0 times a thickness of the material of the second end portion 31. The deformed portion 35 of the second end portion 31, due to its larger radius, is less resistant to rolling of the material of the second tube section 15A and is less supportive of the columnar strength of the second tube section 15A. In fact, second end portion 31 is configured to initiate a telescoping rolling of the second tube section 15A during impact as the first tube section 14A maintains its columnar strength. The fact that the tube sections 15A and 16A are annealed, and the first tube section 14A is not annealed, further facilitates and causes this result (although annealing is not required to have a tendency of a material to roll). Clearances are provided for the flow of material as necessary as it rolls. Potentially, the tube sections 14A and 15A can be sized to provide support to each other during the rolling of material during an impact. The pre-set condition of the intermediate tube section 16A also is important since it helps avoid an initial sharp high load peak, such that the load quickly levels off as it reaches a predetermined initial level, and then remains at that level during the impact stroke. (See FIG. 17.)

A second energy management tube 13B (FIGS. 14-16) includes a first tube section 14B, a second tube section 15B, and an intermediate tube section 16B interconnecting the tube sections 14B and 15B. However, tube 13B differs from tube 13A. In tube 13B, the end portion 30B of the larger-diameter first tube section 14B includes deformed material 34B defining a larger radius. Further, the deformed material 34B is not flared outwardly, but instead remains generally within a boundary defined by an outer surface of the first tube section 14B. Concurrently, the end portion 31B of the second tube section 15B includes deformed material 35B defining a smaller radius. The deformed material 35B is flared inwardly inside of a tubular boundary 32B, such as at a minimum angle of about 12°.

Figure 13:
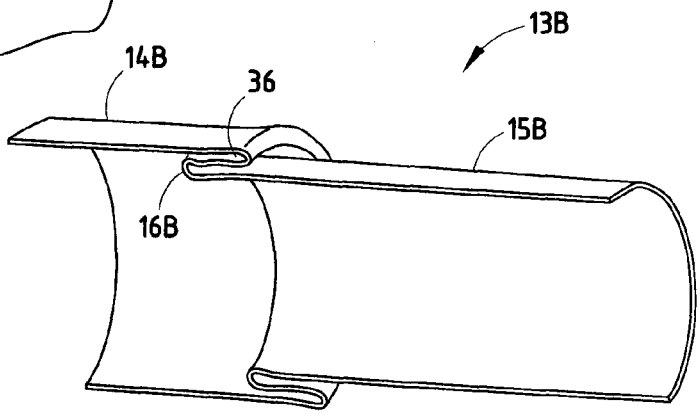
FIG. 13 is a perspective view of the tube shown in FIG. 14, the tube being partially telescopingly collapsed and including rolled material on the larger diameter tube section.

FIG. 13 shows a partial stroke impact where a section of material 36 from the first tube section 14B of tube 13B has rolled. (In tube 13A, the second smaller tube section 15A is the one that rolls during an impact as it rolls in a similar manner.)

Figure 17:
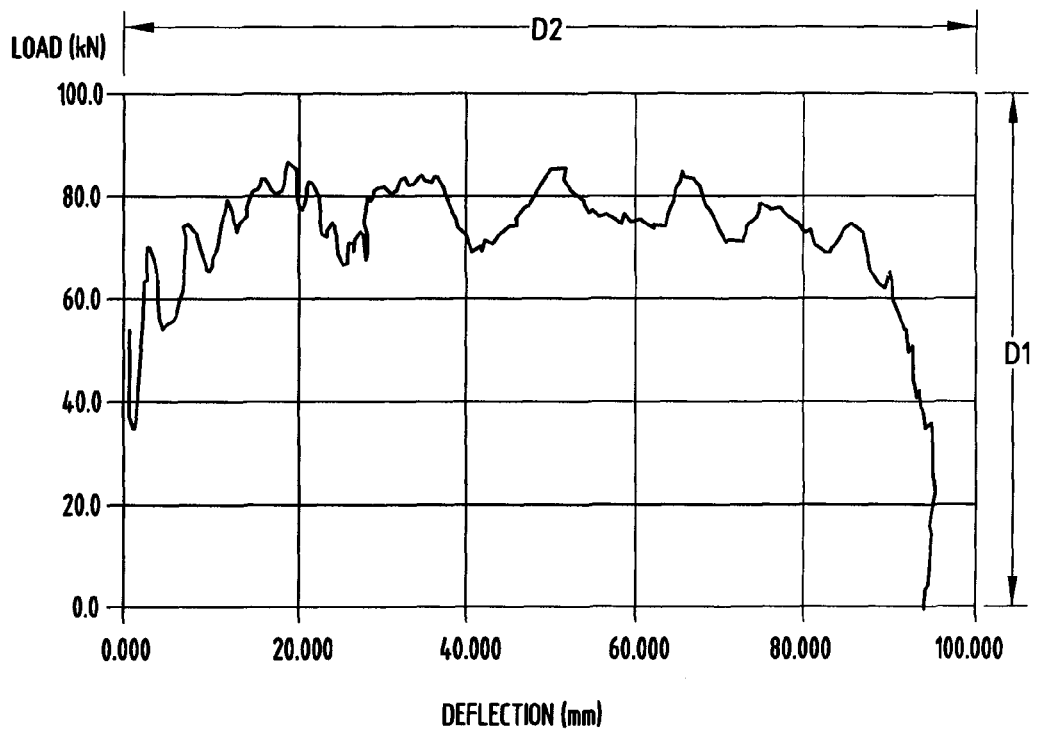
FIG. 17 is a graph showing a load-versus-deflection curve for a longitudinal impact of the tube shown in FIG. 10.

FIG. 17 illustrates a typical load-versus-deflection curve for tubes 13A and 14A. While there is some variation in loading during the impact stroke, it will be apparent to a person skilled in the art of designing energy management systems, such as for bumpers and frames, that the load quickly comes up to a predetermined level, and stays relatively consistently at the selected level throughout the impact stroke. The area under the load deflection curve represents actual energy absorption ("AEA") during an impact stroke. A perfect energy absorption ("PEA") would be calculated by multiplying the maximum load achieved during an impact (D1) times the full impact stroke (D2). The present energy management system provides an exceptionally high efficiency rating (i.e. "AEA" divided by "PEA"). Specifically, the present energy management tube technology ends up with much higher and more consistent energy-absorption efficiency rating than known bumper crush towers, due to a relatively fast initial loading, and a relatively well-maintained and consistent level of loading continued through the entire impact stroke. Specifically, the present inventive concepts provide surprising and unexpected consistency and reliability of the load-versus-deflection curves, and also provide for consistent and reliable energy absorption and crush strokes.

Figure 18:
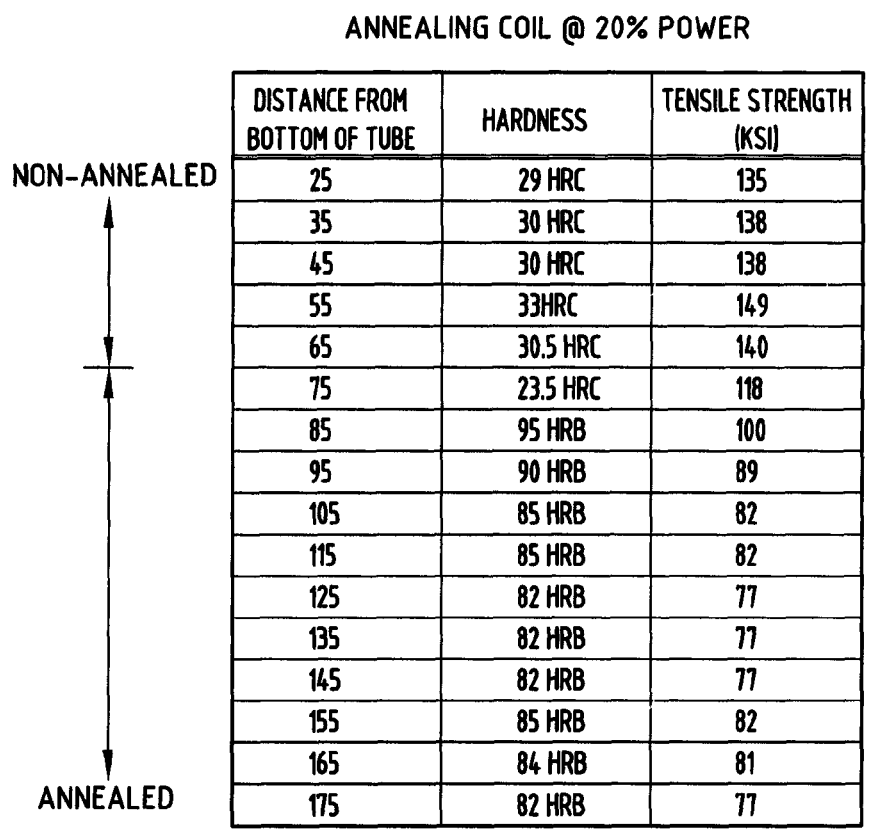
FIG. 18 is a chart showing the effect of annealing on hardness and tensile strength versus a distance from a bottom of the tube of FIG. 10 with the tube stood on end and with the intermediate section (ranging from about 75 mm to about 95 mm) and the second tube section being annealed.

FIG. 18 is a chart showing a typical annealed tube such as may be used to get the result of FIG. 17. The sequence of annealing temperature shows a gradual reduction of yield strength, a reduction in tensile strength, and an overall increase in strain and formability based on increasing annealing temperatures. It also shows a general relationship between tensile strength and yield strength, as well as a relationship between those properties and strain.

Figure 11:
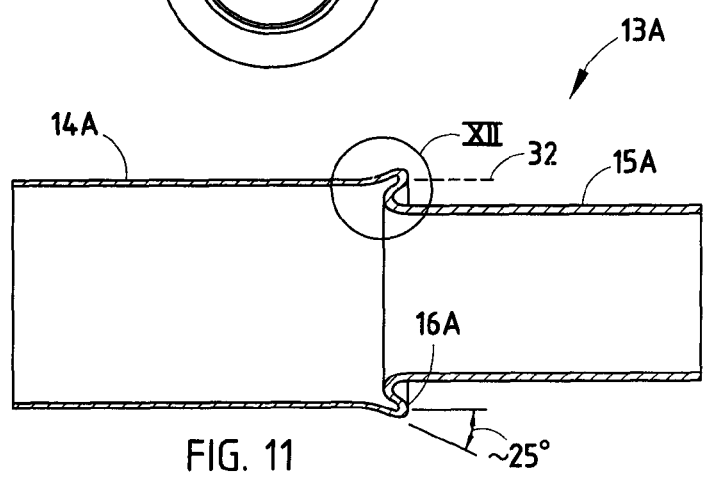
Figure 12:
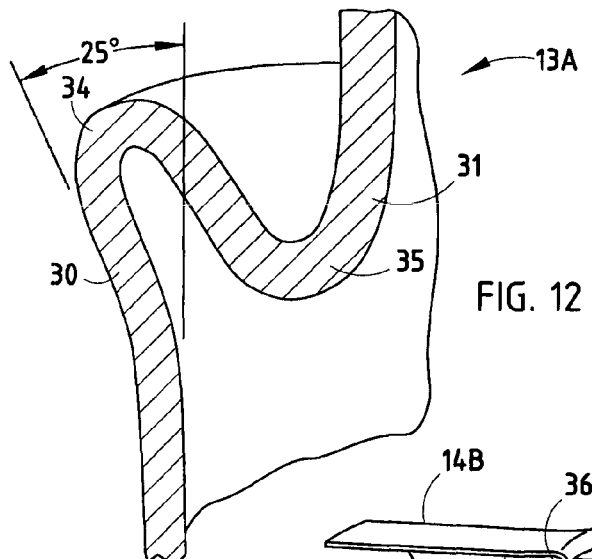
FIG. 12 is an enlarged view of the circled area XII in FIG. 10.
Figure 15:
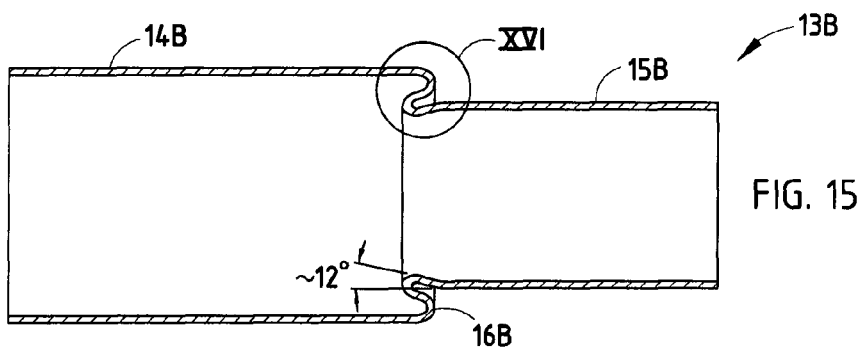
Figure 16:
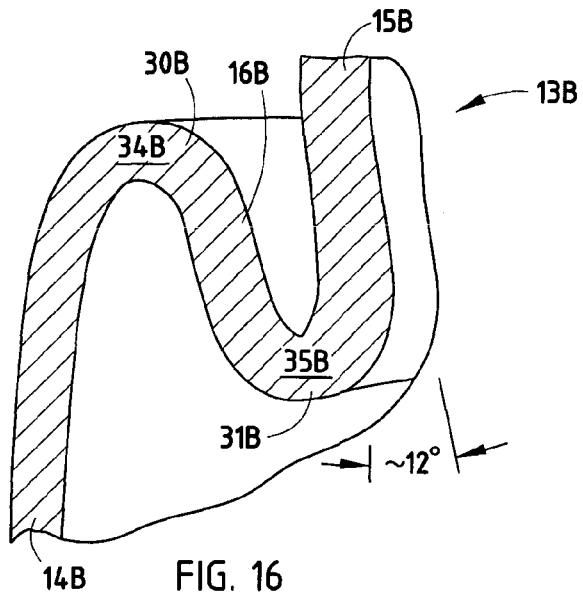
FIG. 16 is an enlarged view of the circled area XVI in FIG. 15.
Figure 19:
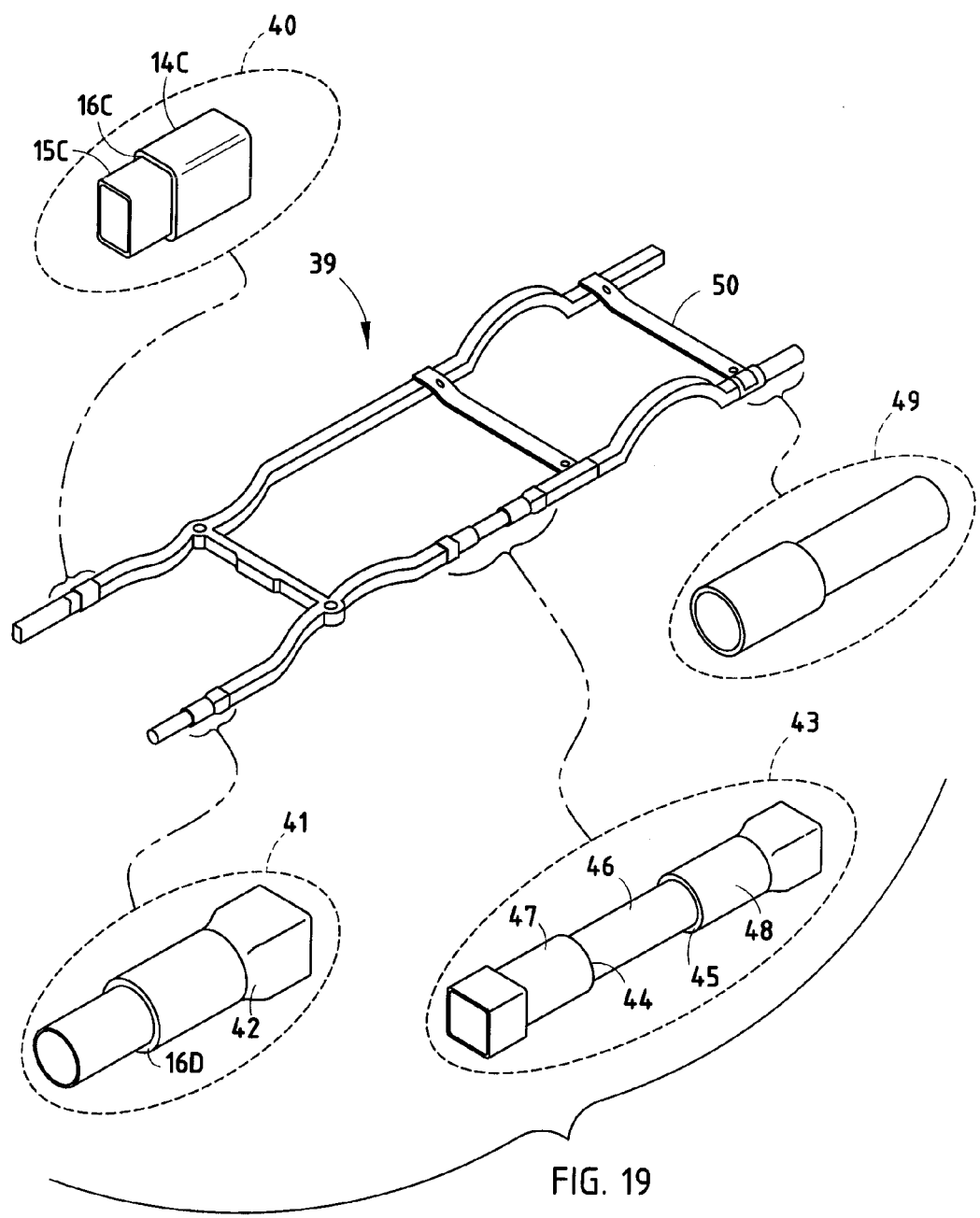
FIG. 19 is a perspective view of a vehicle frame incorporating the present energy management tube of FIG. 10, including enlargement of four particular areas where the energy management system of the present invention is used.

FIG. 19 is a perspective view of a tubular vehicle frame incorporating concepts of the present energy management tube of FIGS. 11 and 15 into its tubular side members. Four particular areas are shown in enlargements next to the four areas, each illustrating a place where the energy management system technology of the present invention could be used. However, it is noted that the present technology could be used in additional areas. Further, in a "real" frame, the locations of use would most likely be in more symmetrical locations on the frame.

The illustrated tube 40 (FIG. 19) is located near a front end of the vehicle frame 39, in a longitudinal portion of the front frame side frame member, just in front of a front cross car beam. The tube 40 is rectangular in cross section, and includes a single intermediate tube section (16C) (see FIG. 11) configured to initiate rolling material of one of the tubes (14C or 15C) during telescoping impact. The energy management tube 40 is located in a similar forward location on the vehicle frame. Tube 40 is circular in cross section, and includes a single intermediate tube section (16D) for initiating rolling of material during telescoping impact. The tube 40 also includes a transition zone 42 on one end where the circular cross section transitions to a square section for engaging a front (or rear) end of a vehicle frame member. Tube 40 could be used, for example, to support a vehicle bumper.

The two-ended tube 43 is located at a mid-section of a side of the illustrated vehicle frame. The tube 43 is circular in cross section, and includes two intermediate tube sections 44 and 45 facing in opposite directions on opposing ends of a smaller diameter centrally located tube section 46. The tube 43 further includes two larger diameter tube sections 47 and 48 on each outer end of the intermediate tube sections 44 and 45.

Further, the larger diameter tube sections transition to a square cross section at their outer ends. Another energy management tube 49 is similar to tube 40, and is located at an end of one side member of the vehicle frame. However, instead of being in front of the nearest cross beam, the cross beam 50 is attached directly to the larger diameter tube section of the energy management tube 49, such as by welding.

Figure 20:
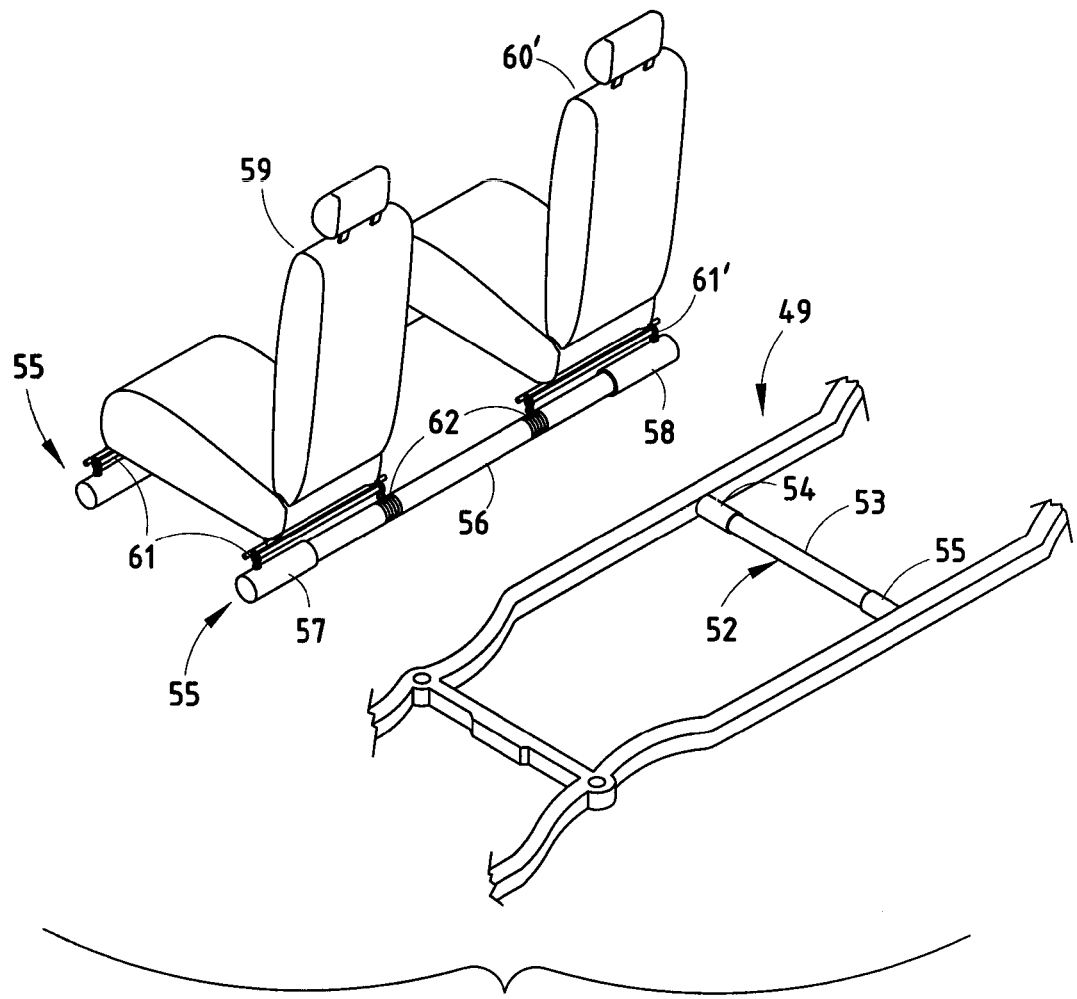
FIG. 20 is a perspective view of two cross car beams, one being a cross car beam used in a vehicle frame located under the vehicle's floor-pan, and the other being a cross car beam used above the vehicle's floor pan and used to support vehicle seats.

FIG. 20 is a perspective view of two cross car beams, one being a cross car beam 52 used in the same plane as a vehicle frame. The beam or energy-management tube 52 is similar to two-ended tube 43, discussed above. It includes a smaller diameter tube section 53 placed in a middle position, and two larger diameter tube sections 54 and 55 are attached to the side members of the vehicle frame. Notably, the ends of the tube 13A (or 13B) can be annealed to facilitate reforming to better match the geometry of the frame rails.

The other energy management system of FIG. 20 includes a pair of tube sections 55 placed as cross car beams but used above the vehicle's floor pan or at least positioned at a location relative to the floor pan where the seats can be anchored on them. Each tube 55 is similar to tube 52, in that opposing ends of it are anchored to sides of the vehicle. Each tube 55 includes a smaller middle tube section 56 and two outer larger tube sections 57 and 58. The vehicle includes seats 59 and 60' with front and rear outer legs 61 attached to the larger tube sections 57 and 58, and with front and rear inner legs 62 attached to the smaller tube section 56.

Figure 21:
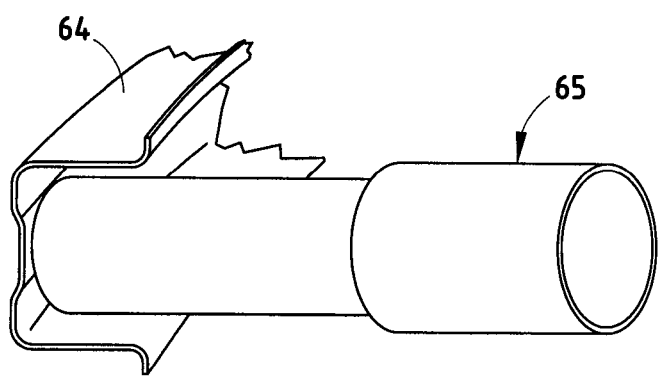
FIG. 21 is a perspective view of a bumper system incorporating a bumper reinforcement beam and a crush tower supporting the bumper beam on a vehicle frame.

FIG. 21 is a perspective view of a bumper system incorporating a bumper reinforcement beam 64 and an energy management tube 65 supporting the bumper beam 64 on a vehicle frame. The crush tower 65 is an energy management tube similar to the tube 40 and does not need to be discussed in detail.

FIG. 22 is a perspective view of a cross car beam 67 used to support an instrument panel 68. The beam 67 includes a single long smaller diameter tube section 69, and two larger diameter tube sections 70 at each end. The larger diameter tube sections 70 are attached to a vehicle structure, such as at the vehicle "A" pillars just in front of the front passenger doors. Several collars 71 are positioned on the smaller diameter tube section 69, for supporting brackets 72 and opened attachment flanges 73. Brackets 72 are used to anchor various items, such as the instrument panel 68, and various components and accessories in and around the instrument panel 68.

FIG. 23 is a perspective view showing a crushable insert 75 positioned at an outer end of an energy management tube 76, and ready to be axially installed therein. The tube 76 includes a small diameter tube section 77, a large diameter tube section 78, and an intermediate tube section 79 interconnecting them and designed to provide a predetermined rolling of material of the small diameter tube section 77 as the small diameter tube section 77 moves rollingly into the large diameter tube section 78 upon longitudinal impact. The crushable insert 75 includes structural rings 80 having circumferential strength and that are adapted to radially support the large diameter tube section 78. The structural rings 80 are interconnected by thin rings 81 that space the structural rings 80 longitudinally apart. However, the thin rings 81 have a predetermined longitudinal strength, such that they collapse with a predetermined force upon receiving forces in a longitudinal direction. Thus, the crushable insert 75, when positioned within the energy management tube 76 (FIG. 24), initially fits snugly into the large diameter tube section 78 in a manner that prevents rattling. However, during longitudinal impact, as the small diameter tube section 77 is moved into and toward large diameter tube section 78, the material of the small diameter tube section 77 begins to roll and move into engagement with an end of the crushable insert 75. As the small diameter tube section 77 rolls, the thin rings 81 of the crushable insert 75 collapse, making additional room for more rolled material. The sequence continues, until the crushable insert 75 is fully crushed. During the impact stroke, the crushable insert 75 engages and helps control the material that is rolling. For example, in one test, the crushable insert 75 increased the longitudinal load by 10,000 pounds force. Also, testing has potentially shown that the load can be made more consistent, thus increasing the efficiency rating (i.e. "AGA" divided by "PEA", as described above) of the energy management system.

Thus, the crushable inserts provide additional resistance to rolling of tube section 77 and can be used to tune the performance of the energy management tube. The illustrated crushable insert 75 in FIGS. 22 and 23 is made of an elastomer material that, upon longitudinal loading, will crush when imparted by the rolling radius of the intermediate tube section 79. Convex circular rings 81 are positioned between thicker boundary rings 80. When the crushable inserts are loaded, the rings 80 transfer load to the convex region which initiate crush on loading. Outward crushing of the convex region 81 is impeded by the inner surface of tube section 78. Similar performance can be achieved when tube section 78 rolls and tube section 77 maintains column strength. The crushable inserts can be made from various materials and different geometry can be used to tune the performance of the energy management tube. Crushable inserts can be used to tune the tube performance instead of increasing tube diameter or material thickness. Some standard ways to tune the performance of the tube can be accomplished by increasing the material thickness or increasing the tube diameter. The use of crushable inserts provides an alternative way to tune performance without the addition of significant cost and without the added penalty of weight.

FURTHER MODIFICATION

The reference numeral 113 (FIG. 25A) generally designates another embodiment of the present invention, having a plastic energy management tube. The plastic energy management tube 113 is similar to the previously described energy management tube 13A. The plastic energy management tube 113 includes a first tube section 114, a second tube section 115 that is aligned with the first tube section 114, and an intermediate tube section 116 connected to the first tube section 114 and the second tube section 115. The first tube section 114 is dimensionally larger in size than the second tube section 115, and preferably has a similar cross-sectional shape. However, it is noted that the first and second tube sections 114 and 115 can be different shapes including hexagonal, octagonal, elliptical, race-track shaped, cylindrical, rectangular, square, oval, round, or other geometric shapes. Furthermore, it is contemplated that the tube sections 114 and 115 may have different cross-sectional shapes along their lengths, especially at locations spaced away from the intermediate tube section 116 where the tube sections 114 and 115 must be adapted to connect to different structures, such as vehicle frame components and the like. The intermediate tube section 116 has a shape transitioning from the first tube section 114 to the second tube section 115.

The illustrated plastic energy management tube 113 is preferably made of a thermoplastics often used in parts for absorbing energy such as PC, PBT, PC/PBT, PC/ABS, and other combinations plastic with each of the tube sections 114, 115, and 116 being integrally formed or molded together as a unit. The plastic energy management tube 113 is preferably made in an injection mold, although it is contemplated that the plastic energy management tube 113 can be made in other manners. The wall thickness can be varied as needed to satisfy functional design requirements. The plastic energy management tube 113 can also include a metal parts insert molded therein to build reinforcing strength of the plastic energy management tube 113 and/or to assist in assembling the plastic energy management tube 113 to other components.

As illustrated in FIGS. 25A-25C, the first tube section 114 is larger in size than the second tube section 115. The intermediate tube section 116 includes a first end portion 130 connected to a top of the first tube section 114 and a second end portion 131 connected to a bottom of the second tube section 115. The illustrated first end portion 130 has an inverted "L" shaped section and the second end portion 131 has a "U" or "J" shaped section and is connected to the first end portion 130. As illustrated in FIGS. 25B and 25C, the first end portion 130 preferably includes additional material 133 extending between the two legs of the "L" shaped section. During crushing of the plastic energy management tube 113, the second tube section 115 begins telescoping rolling at the second end portion 131 of the intermediate tube section 116 to crush the plastic energy management tube 113 as illustrated in FIG. 25C. The first tube section 114 and the first end portion 130 preferably remain stationary during crushing of the second tube section 115. The additional material 133 helps to reinforce the first end portion 130. Therefore, the second end portion 131 is configured to initiate a telescoping rolling of the second tube section 115 during impact as the first tube section 114 maintains its columnar strength. Clearances are provided for the flow of material as necessary as it rolls. Potentially, the tube sections 114 and 115 can be sized to provide support to each other during the rolling of material during an impact. The second end portion 131 (or the pre-set condition of the intermediate tube section 116) also is important since it helps avoid an initial sharp high load peak, such that the load quickly levels off as it reaches a predetermined initial level, and then remains at that level during the impact stroke. The plastic energy management tube 113 uses the rolling of material to create a load versus deflection response that is void of peaks and valleys but instead can be designed to produce a flat response as illustrated in FIG. 25D. A square wave response represents the most efficient absorption of energy. Upon loading, load increases until the column strength of the structure is reached and then rolling will initiate. Uniform rolling will happen at a level load until all energy is absorbed.

Figure 26B:
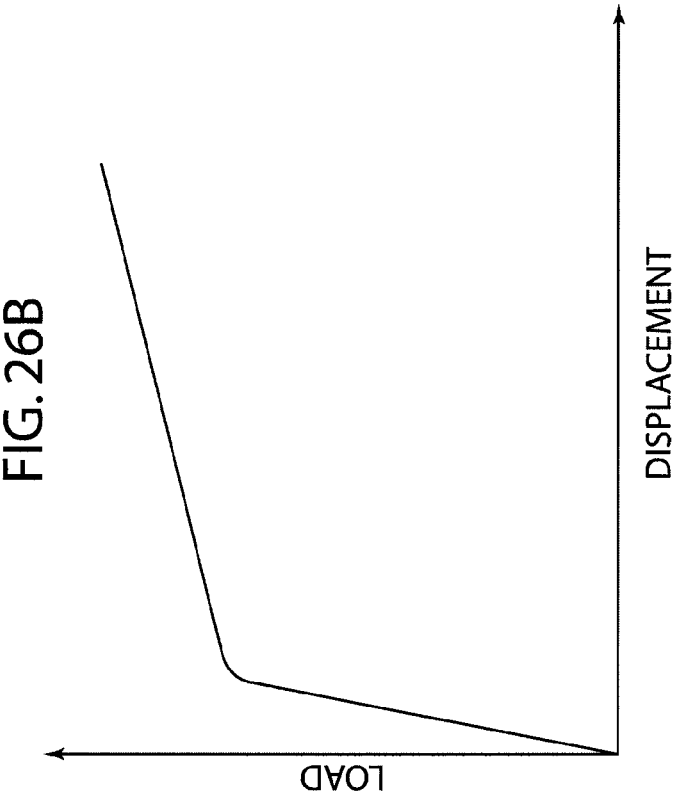
FIG. 26B is a graph showing a load v. displacement chart for the second embodiment of the plastic EMT of the present invention.
Figure 26A:
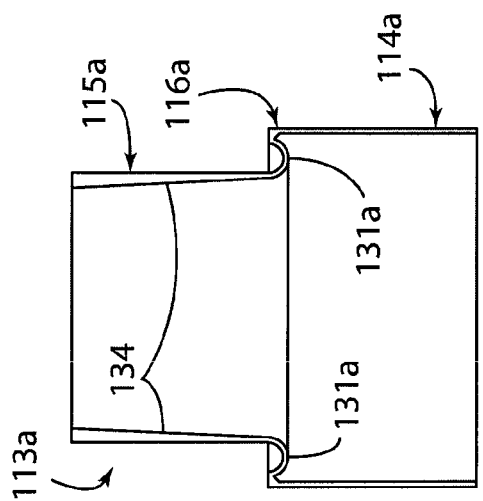
FIG. 26A is a cross-sectional view of a second embodiment of the plastic EMT of the present invention.

The reference numeral 113a (FIG. 26A) generally designates another embodiment of the present invention, having a second embodiment for the plastic energy management tube. Since plastic energy management tube 113a is similar to the previously described plastic energy management tube 113, similar parts appearing in FIGS. 25A-25C and FIG. 26A, respectively, are represented by the same, corresponding reference number, except for the suffix "a" in the numerals of the latter. The second embodiment of the plastic energy management tube 113a includes a second tube section 115a having an inner wall 134 tapering from the second end portion 131a of the intermediate tube section 116a. The tapering of the inner wall 134 provides a rising load as illustrated in the load versus deflection graph of FIG. 26B.

The reference numeral 113b (FIG. 27A-27D) generally designates another embodiment of the present invention, having a third embodiment for the plastic energy management tube. Since plastic energy management tube 113b is similar to the previously described plastic energy management tube 113, similar parts appearing in FIGS. 25A-25C and FIG. 27A-27D, respectively, are represented by the same, corresponding reference number, except for the suffix "b" in the numerals of the latter. The third embodiment of the plastic energy management tube 113b includes an inner energy management tube section 140. The inner energy management tube 140 is substantially an inverted version of the first embodiment of the plastic energy management tube 113, which is connected by a spanning portion 141 to an end of the second tube section 115b distal the second end portion 131b of the intermediate tube section 116b. Therefore, the inner energy management tube 140 includes a first tube section 114b', a second tube section 115b' and an intermediate tube section 116'.

As illustrated in FIG. 27B, the third embodiment of the plastic energy management tube 113b crushes in the same manner as the first embodiment of the plastic energy management tube 113. Therefore, the second tube section 115b begins telescoping rolling at the second end portion 131b of the intermediate tube section 116b to crush an outer portion of the plastic energy management tube 113b as illustrated in FIG. 27B. The first tube section 114b and the first end portion 130b preferably remain stationary during crushing of the second tube section 115b. The additional material 133b once again helps to reinforce the first end portion 130b. Therefore, the second end portion 131b is configured to initiate a telescoping rolling of the second tube section 115b during impact as the first tube section 114b maintains its columnar strength. Clearances are provided for the flow of material as necessary as it rolls. Potentially, the tube sections 114b and 115b can be sized to provide support to each other during the rolling of material during an impact. The second end portion 131b (or the pre-set condition of the intermediate tube section 116b) also is important since it helps avoid an initial sharp high load peak, such that the load quickly levels off as it reaches a predetermined initial level, and then remains at that level during the impact stroke.

After the outer portion of the third embodiment of the plastic energy management tube 113b has been crushed as illustrated in FIG. 27B, the inner energy management tube section 140 will crush along with a continuation of a crush of the outer portion of the third embodiment of the plastic energy management tube 113b. Therefore, the first tube section 114b' begins telescoping rolling at a first end portion 131b' of the intermediate tube section 116b' to crush the inner energy management tube section 140 as illustrated in FIG. 27C. The second tube section 115b' and a second end portion 130b' preferably remain stationary during crushing of the second tube section 115b. The additional material 133b' once again helps to reinforce the second end portion 130b'. Therefore, the first end portion 131b' is configured to initiate a telescoping rolling of the first tube section 115b' during impact as the second tube section 115b'maintains its columnar strength. Clearances are provided for the flow of material as necessary as it rolls. Potentially, the tube sections 114b' and 115b' can be sized to provide support to each other during the rolling of material during an impact. The first end portion 131b' (or the pre-set condition of the intermediate tube section 116b') also is important since it helps avoid an initial sharp high load peak, such that the load quickly levels off as it reaches a predetermined initial level, and then remains at that level during the impact stroke.

The plastic energy management tube 113b uses the rolling of material to create a load versus deflection response that is void of peaks and valleys but instead can be designed to produce a flat response during the crush of the outer portion of the third embodiment of the energy management tube 113b as illustrated between points 145 and 150 in FIG. 27D and another higher flat response during the crush of both outer portion of the third embodiment of the energy management tube 113b and the inner energy management tube section 140 as illustrated between points 150 and 160 in FIG. 27D.

Figure 27E:
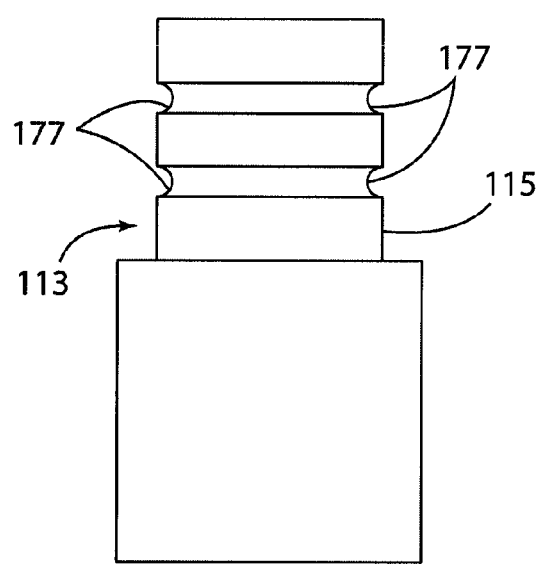
FIG. 27E is a front view of a modification to the plastic EMT of the present invention.
Figure 27F:
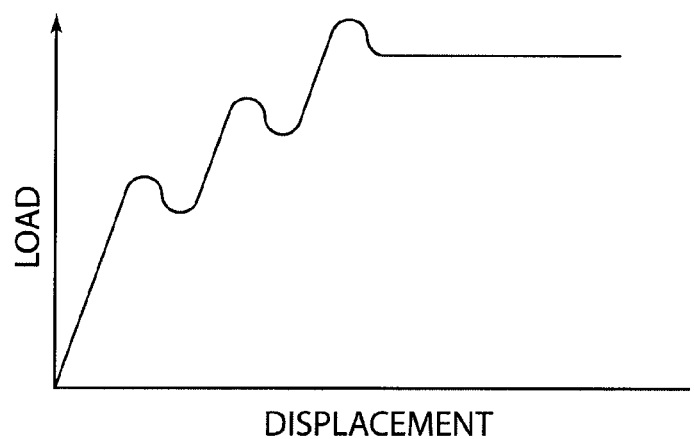
FIG. 27F is a graph showing a load v. displacement chard for the modified plastic EMT of the present invention.

In the plastic energy management tubes 113, 113a and 113b described above, either the first tube section 114 or the second tube section 115 can be connected to a support structure such that the plastic energy management tubes 113, 113a and 113b can be reversible. Furthermore, the inner energy management tube section 140 of the third embodiment of the plastic energy management tube 113b can be positioned in a reverse orientation such that the second tube section 115b' is connected to the spanning portion 141. Furthermore, the plastic energy management tube 113, 113a or 113b could comprise several sections that get progressively smaller (see FIG. 28C). Moreover, any of the tube sections can include tapering walls as described above in the second embodiment of the plastic energy management tube 113a. Furthermore, any of the plastic energy management tubes 113, 113a and 113b could include crush initiating grooves 177 as illustrated in FIG. 27E, which will provide a sinus wave energy curve as illustrated in FIG. 27F. Although the grooves 177 are shown as being on the second tube section 115, the grooves 177 can be on any of the tube sections.

Figure 32:
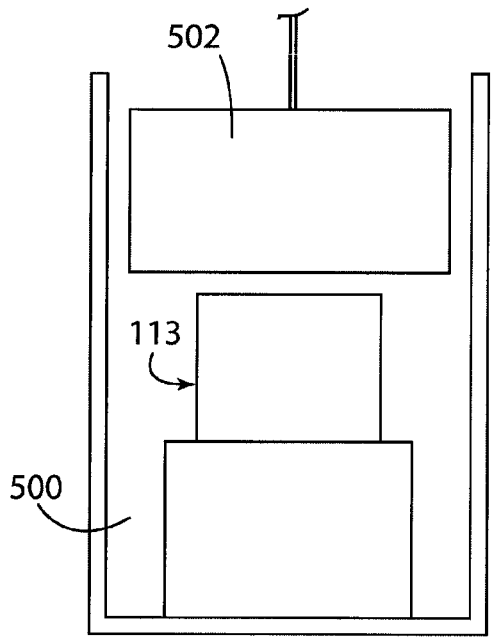
FIG. 32 is a representation of an elevator shaft employing the plastic EMT of the present invention.

Applications of plastic energy management tubes 113, 113a and 113b include stand alone crushable structures and/or crushable features molded into larger plastic molded parts without the need for tolling action and moving parts in the tooling for providing uncuts and blind surfaces in the molded parts. The size of the parts can be molded to any size desired and the combination of multiple plastic EMTs can be molded to work in either parallel, series or configured to encompass a large surface area. A single plastic EMT 113, 113a or 113b can be used as a knee bolster 200 in vehicles in front of the driver's knee 202 as illustrated in FIG. 28A, as a crushable member in front of another structure such as a plastic EMT 113, 113a and 113b in front of a bumper system 210 and behind facia 212 as shown in FIG. 27B, as a bumper bracket between a support frame 220 of a vehicle and facia 222 as shown in FIG. 28C, as an inside component to A and B pillars of a vehicle (not shown), as a highway embankment to protect supports 240 for a bridge 242 as shown in FIG. 27D or in other manners. Furthermore, a grouping of plastic EMTs can be used across a face of a bumper 300 as an energy absorber as shown in FIG. 29 or within a beam 400 (e.g., the beam disclosed in U.S. patent application Ser. No. 10/808,127 entitled ENERGY MANAGEMENT BEAM, the entire contents of which are herein incorporated herein by reference) as shown in FIGS. 30A-30C, or used within a headliner of a vehicle for head protection as shown in FIGS. 31A and 31B. Furthermore, the plastic energy management tube 113, 113a or 113b can be used in a bottom of an elevator shaft 500 to absorb energy of a dropping elevator 502 as shown in FIG. 32. Basically, anywhere that energy absorption is needed either as a stand alone structure or for larger areas where an area is required to provide energy absorption, the plastic EMT technology can be used.

The advantages of using plastic to fabricate the part include flexibility to mold complicated shapes and mold in complex features that can be used to tune the performance of the invention. The plastic EMT does not need a larger tube having an outwardly flared larger diameter section that promotes telescoping of the smaller diameter section into the larger diameter section due to the ability to change thickness in the molding process. The plastic molding process is extremely flexible. Simple single or multiple EMT structure parts are easily molded in simple in/out dies. More complex structures that include internal stiffening ribs and vanes may require a die that incorporates action. The flexibility of molding plastic allows for the specification of material thickness where it is needed. Changes in thickness can be used to provide column strength and desired rolling loads. The ability to change thickness of the plastic and the flexibility provided by the molding process illustrate the advantage associated with the use of plastic. EMTs can also be molded within and nested within other EMTs to create additional load tuning capability (see FIG. 28B).

ADDITIONAL EMBODIMENTS

The reference numeral 1010 (FIGS. 33 and 34A) generally designates an embodiment of the present invention, having an energy management tube. The energy management tube 1010 includes an outside tube 1012 and an inside tube 1014. The outside tube 1012 has a generally hexagonal cross section and includes a bottom first tube section 1016, a middle second tube section 1018 and a top third tube section 1020. The first tube section 1016 is dimensionally larger in size than the second tube section 1018, and preferably has a similar cross-sectional shape. Likewise, the second tube section 1018 is dimensionally larger in size than the third tube section 1020, and preferably has a similar cross-sectional shape. However, while the outside tube 1012 is illustrated as having a hexagonal cross-sectional shape, it is noted that the first tube section 1016, the second tube section 1018 and the third tube section 1020 can be different shapes including octagonal, elliptical, race-track shaped, cylindrical, rectangular, square, oval, round, or other geometric shapes. Furthermore, it is contemplated that the tube sections may have different cross-sectional shapes along their lengths, especially at locations where the tube sections must be adapted to connect to different structures, such as vehicle frame components and the like. Moreover, the wall thickness can be varied as needed to satisfy functional design requirements. The energy management tube 1010 can be formed of any material (e.g., metal or plastic) and can be made by any method (e.g., vacuum forming). The energy management tube 1010 can also include a metal parts insert molded therein to build reinforcing strength of the energy management tube 1010 and/or to assist in assembling the energy management tube 1010 to other components. In the illustrated embodiment, the energy management tube is connected to a plate 1022 at the first tube section 1016. The plate 1022 can be welded to portions of a vehicle and/or can be connected to portions of the vehicle by inserting screws into openings 1024 in the plate 1022.

Figure 33:
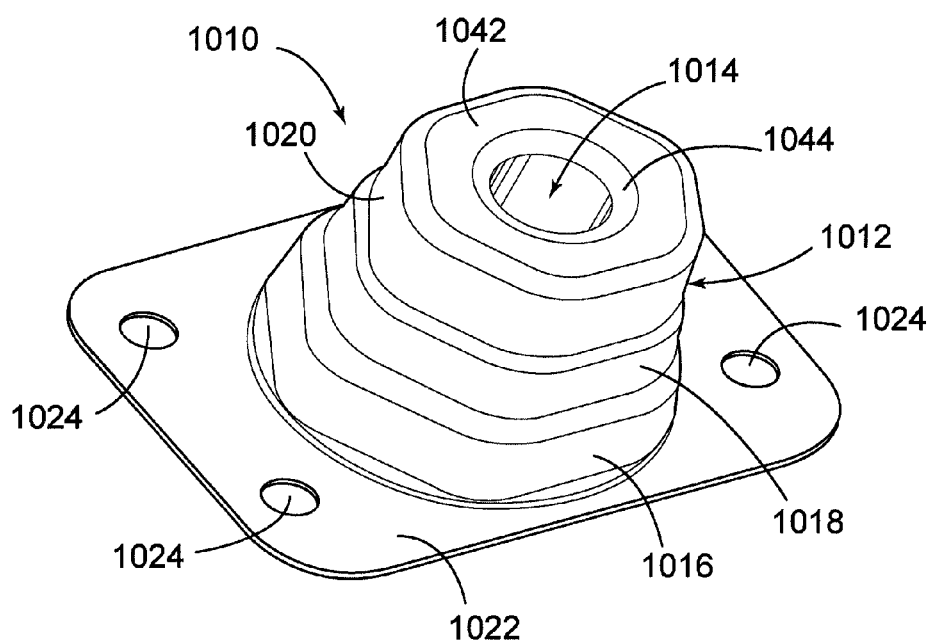
FIG. 33 is a perspective view of a further energy management tube of the present invention.
Figure 34:
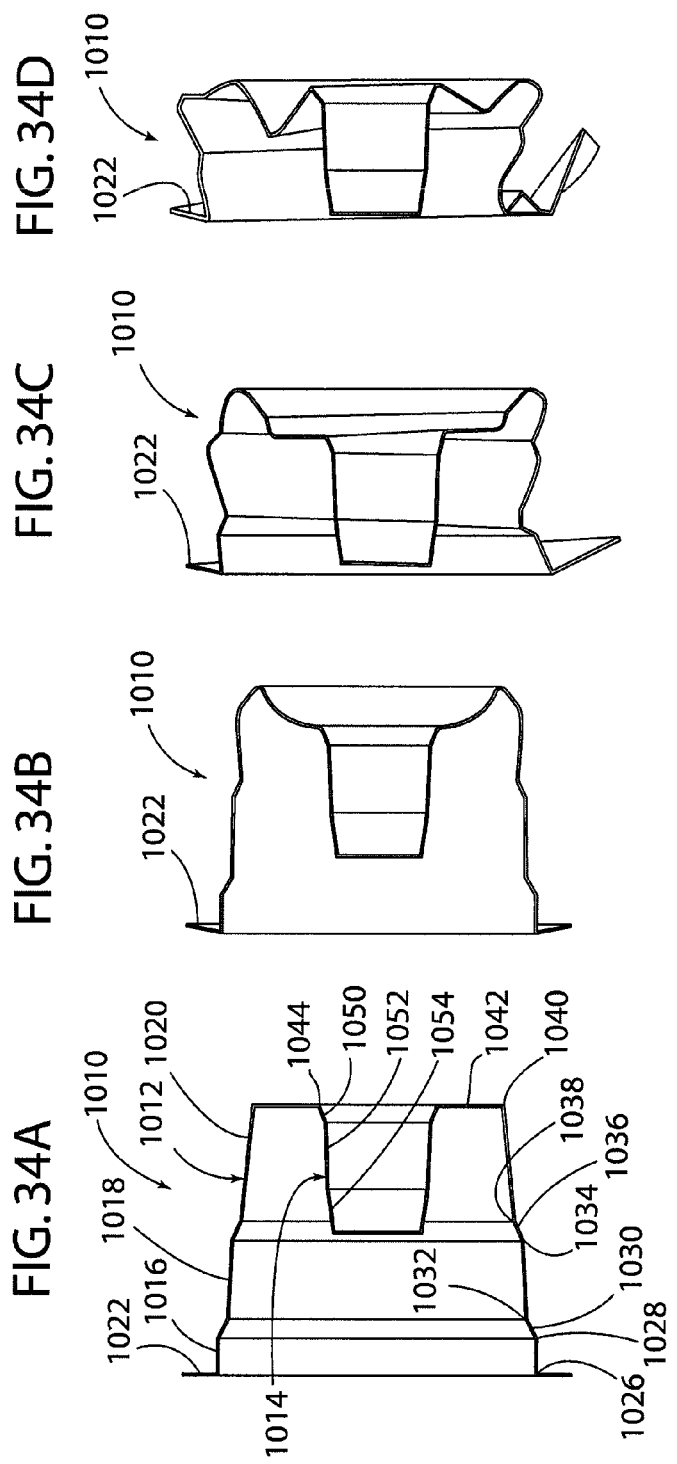
FIG. 34A is cross-sectional view of the further energy management tube of the present invention.
FIG. 34B is cross-sectional view of the further energy management tube of the present invention at a first stage of crushing.
FIG. 34C is cross-sectional view of the further energy management tube of the present invention at a second stage of crushing.
FIG. 34D is cross-sectional view of the further energy management tube of the present invention at a third stage of crushing.

As illustrated in FIGS. 33 and 34A, the energy management tube 1010 comprises the first tube section 1016 including a first end portion 1026 connected to a top of the plate 1022 and a second end portion 1028 connected to the second tube section 1018 by a slanted first step 1030. The first tube section 1016 tapers slightly inwardly from the first end portion 1026 to the second end portion 1028. The second tube section 1018 includes a first end portion 1032 connected to the slanted first step 1030 and a second end portion 1034 connected to the third tube section 1020 by a slanted second step 1036. The second tube section 1018 tapers slightly inwardly from the first end portion 1032 to the second end portion 1034. The third tube section 1020 includes a first end portion 1038 connected to the slanted second step 1036 and a second end portion 1040 connected to an end hexagonal plate 1042. The third tube section 1020 tapers slightly inwardly from the first end portion 1038 to the second end portion 1040. The end hexagonal plate 1042 includes a centrally located opening 1044, with the inside tube 1014 connected to the hexagonal plate 1042 at the opening 1044. In the illustrated example, the inside tube 1014 includes a first tapered portion 1050, a second tapered portion 1052 and a third tapered portion 1054.

Figure 35:
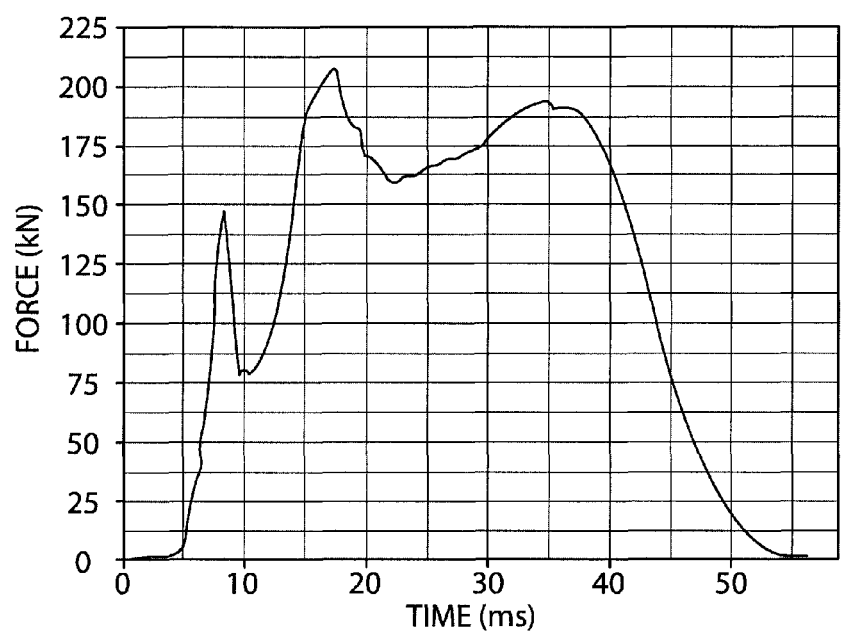
FIG. 35 is a graph showing a load v. time (or displacement) chart for the further energy management tube of the present invention for the stages of crushing illustrated in FIGS. 34B-34D.

During crushing of the energy management tube 1010, the third tube section 1020 begins to crush in a corrugated manner as illustrated in FIG. 34B. Thereafter, the third tube section 1020 will continue to crush and the second tube section 1018 will crush in a corrugated manner. Finally, the inside tube 1014 will abut against a face of the member that the plate 1022 is connected to and will begin to crush along with the first tube section 1016. FIG. 35 shows a load v. time (or displacement) chart for the energy management tube of the present invention for the stages of crushing illustrated in FIGS. 34B-34D.

Figure 43:
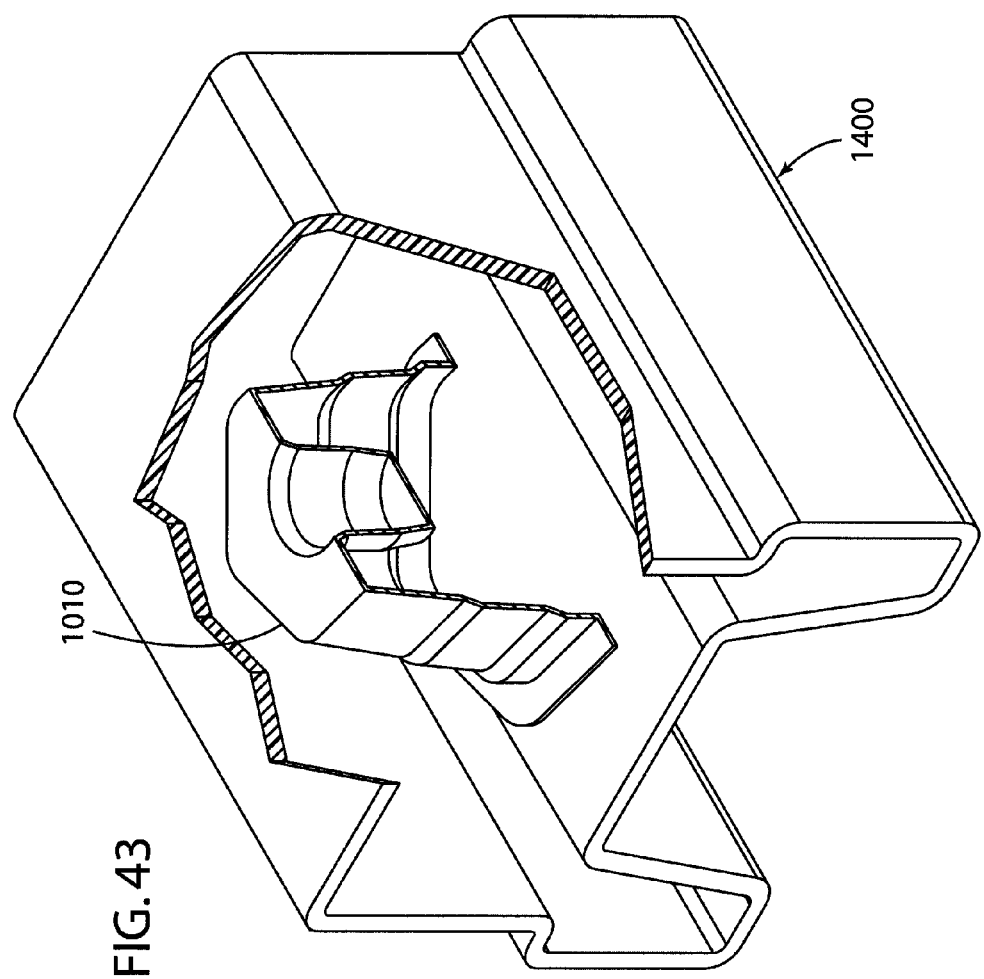
FIG. 43 is a perspective cut-away view of the second embodiment of the bumper beam employing the further energy management tube of the present invention.
Figure 44:
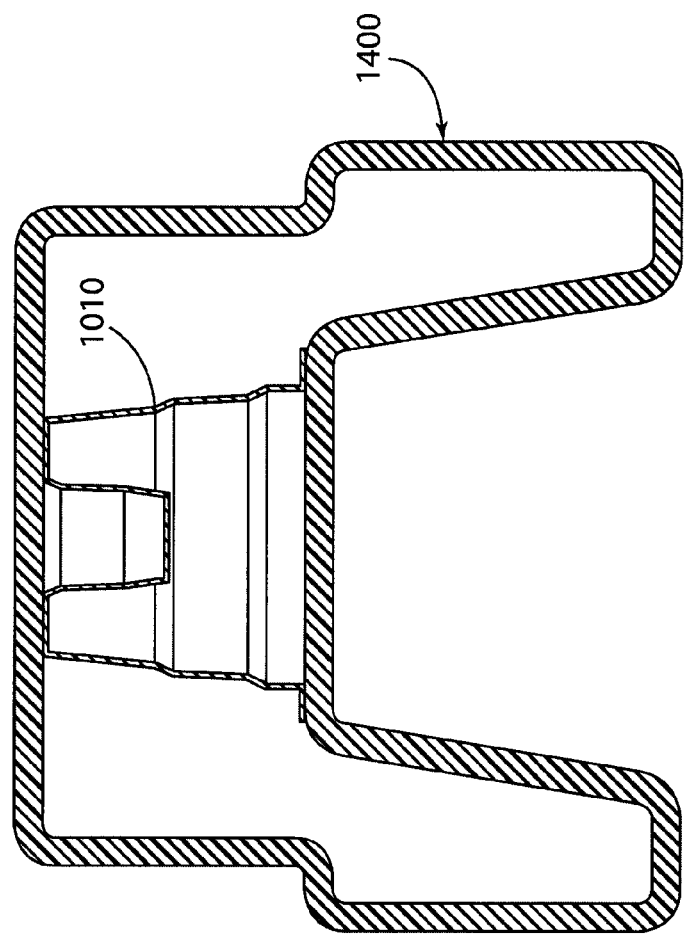
FIG. 44 is a cross-sectional view of the second embodiment of the bumper beam employing the further energy management tube of the present invention.
Figure 45:
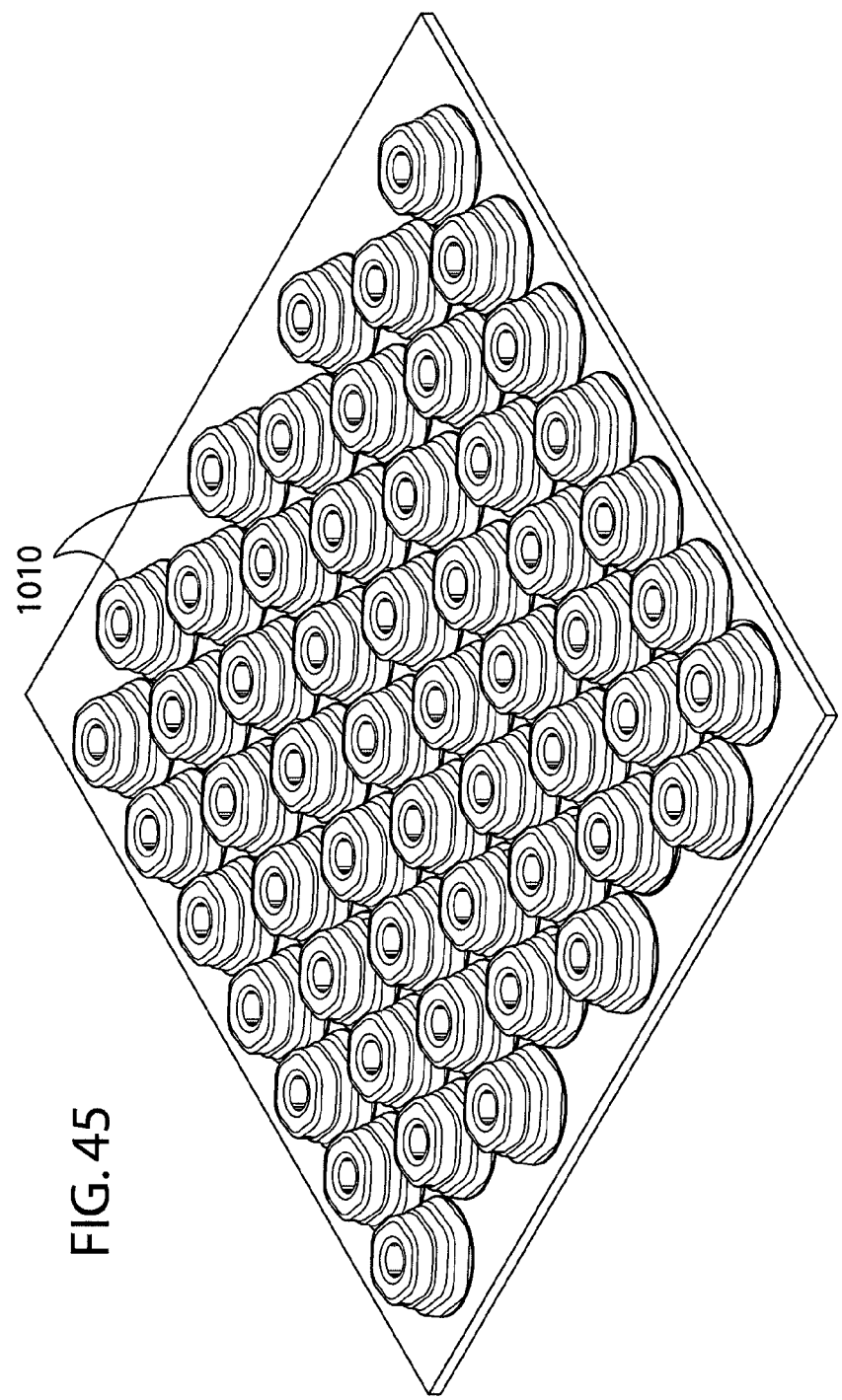
FIG. 45 is a perspective view of a headliner employing the further energy management tube of the present invention.
Figure 47:
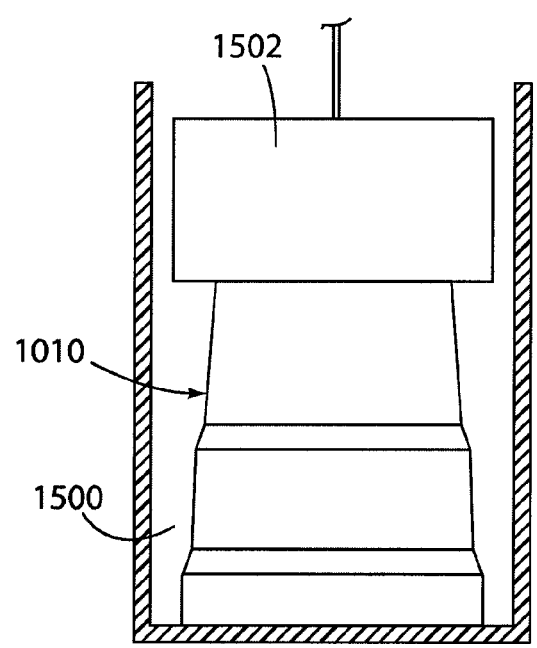
FIG. 47 is a representation of an elevator shaft employing the further energy management tube of the present invention.

Applications of energy management tubes include stand alone crushable structures and/or crushable features incorporated into larger parts. The size of the parts can be formed to any size desired and the combination of multiple energy management tubes can be formed to work in either parallel, series or configured to encompass a large surface area. A single energy management tube 1010 can be used as a knee bolster 1200 in vehicles in front of the driver's knee 1202 (FIG. 37), as a crushable member in front of another structure such as an energy management tube 1010 in front of a beam 1209 of a bumper system 1210 and behind facia 1212 (FIG. 38), as a bumper bracket between a support frame 1220 of a vehicle and a beam 1209 of a bumper system 1210, as an inside component to A and B pillars of a vehicle, and as a highway embankment to protect supports 1240 for a bridge 1242 (FIG. 40) or in other manners. Furthermore, a grouping of energy management tubes can be used across a face of a bumper 1300 (see FIG. 41) as an energy absorber or within a beam 1400 (see FIGS. 42-44) (e.g., the beam disclosed in U.S. patent application Ser. No. 10/808,127 entitled ENERGY MANAGEMENT BEAM, the entire contents of which are herein incorporated herein by reference), or used within a headliner of a vehicle for head protection as shown in FIGS. 45 and 46. Furthermore, the energy management tube can be used in a bottom of an elevator shaft 1500 to absorb energy of a dropping elevator 1502 as illustrated in FIG. 47. Basically, anywhere that energy absorption is needed either as a stand alone structure or for larger areas where an area is required to provide energy absorption, the energy management tube technology can be used. Furthermore, more complex structures that include internal stiffening ribs and vanes may require a die that incorporates action. Changes in thickness can be used to provide column strength and desired rolling loads. Energy management tubes can also be molded or formed within and nested within other energy management tubes to create additional load tuning capability.

Figure 36:
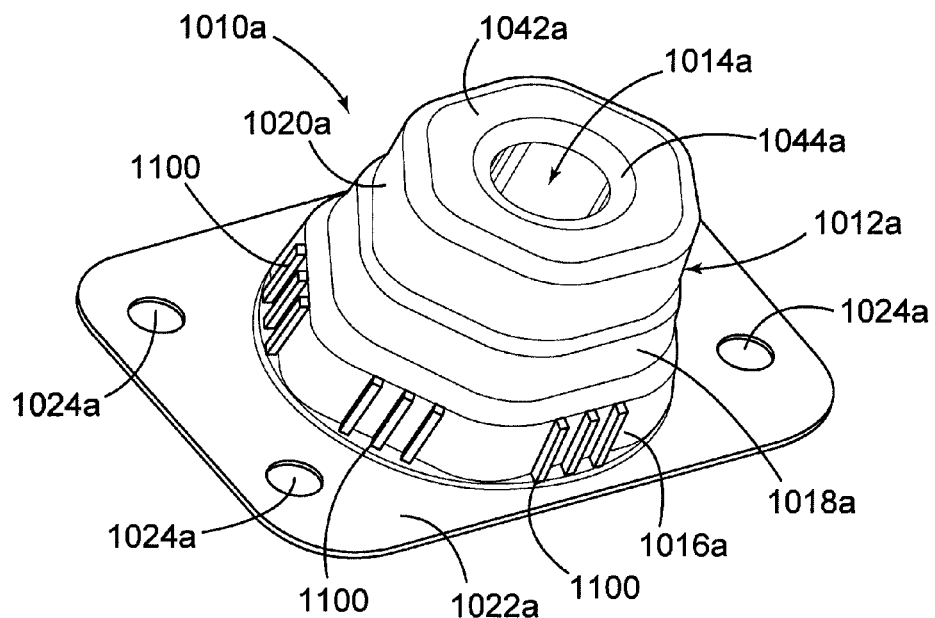
FIG. 36 is a perspective view of a second embodiment of the further energy management tube of the present invention.

The reference numeral 1010a (FIG. 36) generally designates another embodiment of the present invention, having a second embodiment for the energy management tube. Since energy management tube 1010a is similar to the previously described energy management tube 1010, similar parts appearing in FIGS. 33-34D and FIG. 36, respectively, are represented by the same, corresponding reference number, except for the suffix "a" in the numerals of the latter. The energy management tube 1010a is identical to the previously described energy management tube 1010, except that the second embodiment of the energy management tube includes a plurality of fins 1100 on each side of the polygon of the first tube section 1016a. The fins 1100 assist in ensuring that the first tube section 1016a of the energy management tube 1010a crush after the second tube section 1018a and the third tube section 1020a. Furthermore, the fins 1100 add extra crush resistance. While three fins 1100 are illustrated as being located on each side of the polygon of the first tube section 1016a, it is contemplated that any number of fins 1100 (including only one) could be used on the first tube section 1016a or each side of the polygon of the first tube section 1016a. Furthermore, it is contemplated that the second tube section 1018a and/or the third tube section 1020a could include fins 1100, either along with the fins on the first tube section 1016a or as an alternative thereto.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An energy management tube adapted to reliably and predictably absorb substantial impact energy when impacted longitudinally, comprising:
    an outer first tube section and an inner second tube section, the inner second tube section being at least partially located within the outer first tube section, the outer first tube section having a stepped outer surface;
    at least one spanning section connecting a first outer end of the outer first tube section to a first inner end of the inner second tube section;
    the outer first tube section being longer than the inner second tube section, whereby, upon undergoing a longitudinal impact, the outer first tube section crushes predictably and sooner than the inner second tube section upon the energy management tube receiving forces from the longitudinal impact, to thereby create a first energy absorption level during crushing of the outer first tube section alone and a second energy absorption level during crushing of the outer first tube section and the inner second tube section;
    wherein the outer tube section and the inner tube section are concentric.

2. The energy management tube defined in claim wherein the outer first tube section includes a plurality of progressively smaller diameter outer first tube portions.

3. The energy management tube defined in claim 1, wherein the outer first tube section tapers from a larger area at a second outer end to a smaller area at the first outer end.

4. The energy management tube defined in claim 3, wherein the outer first tube section includes a plurality of progressively smaller diameter outer first tube portions.

5. The energy management tube defined in claim 4, wherein the plurality of progressively smaller diameter outer first tube portions comprises at least a first smaller outer tube portion and a second larger outer tube portion, with a slanted portion extending between the first smaller outer tube portion and the second larger outer tube portion.

6. The energy management tube defined in claim 5, wherein the first smaller outer tube portion includes a plurality of strengthening ribs to provide the first smaller outer tube portion with greater columnar strength than the second larger outer tube portion.

7. The energy management tube defined in claim 4, wherein the plurality of progressively smaller diameter outer first tube portions each have a hexagonal cross section.

8. The energy management tube defined in claim 1, including a bumper beam attached to a free end of one of the first and second tube sections.

9. The energy management tube defined in claim 1, including a vehicle frame attached to at least one of the first and second tube sections.

10. The energy management tube defined in claim 1, wherein the first and second tube sections have different geometric cross-sectional shapes.

11. The energy management tube defined in claim 1, wherein at least one of the first and second tube sections includes a round cross section.

12. The energy management tube defined in claim 1, wherein the at least one spanning section is a plate with an opening, the inner second tube section being connected to the plate at a periphery of the opening.

13. The energy management tube defined in claim 12, wherein the opening is circular.

14. The energy management tube defined in claim 1, wherein both the first and second tube sections have a round cross section.

15. An energy management tube adapted to reliably and predictably absorb substantial impact energy when impacted longitudinally, comprising:
- an outer first tube section and an inner second tube section, the inner second tube portion being at least partially located within the outer first tube section, the outer first tube section having a stepped outer surface;
- at least one spanning section connecting a first outer end of the outer first tube section to a first inner end of the inner second tube section;
- the outer first tube section being longer than the inner second tube section, whereby, upon undergoing a longitudinal impact, the outer first tube section crushes predictably and sooner than the inner second tube section upon the energy management tube receiving forces from the longitudinal impact, to thereby create a first energy absorption level during crushing of the outer first tube section alone and a second energy absorption level during crushing of the outer first tube section and the inner second tube section;
- wherein the outer first tube section has a first axis and the inner second tube section has a second axis, the first axis and the second axis being parallel.

16. The energy management tube defined in claim 15, wherein the outer first tube section includes a plurality of progressively smaller diameter outer first tube portions.

17. The energy management tube defined in claim 15, wherein the outer first tube section tapers from a larger area at a second outer end to a smaller area at the first outer end.

18. The energy management tube defined in claim 17, wherein the outer first tube section includes a plurality of progressively smaller diameter outer first tube portions.

19. The energy management tube defined in claim 18, wherein the plurality of progressively smaller diameter outer first tube portions comprises at least a first smaller outer tube portion and a second larger outer tube portion, with a slanted portion extending between the first smaller outer tube portion and the second larger outer tube portion.

20. The energy management tube defined in claim 18, wherein the plurality of progressively smaller diameter outer first tube portions each have a hexagonal cross section.

21. The energy management tube defined in claim 15, including a bumper beam attached to a free end of one of the first and second tube sections.

22. The energy management tube defined in claim 15, including a vehicle frame attached to at least one of the first and second tube sections.

23. The energy management tube defined in claim 15, wherein the first and second tube sections have different geometric cross-sectional shapes.

24. The energy management tube defined in claim 15, wherein at least one of the first and second tube sections includes a round cross section.

25. The energy management tube defined in claim 15, wherein the at least one spanning section is a plate with an opening, the inner second tube section being connected to the plate at a periphery of the opening.

26. The energy management tube defined in claim 25, wherein the opening is circular.

27. The energy management tube defined in claim 15, wherein the outer first tube section tapers from a larger area at a second outer end to a smaller area at the first outer end.

28. The energy management tube defined in claim 27, wherein the taper is not constant.

* * * * *